United States Patent [19]

Eickemeyer et al.

[11] Patent Number: 5,448,746
[45] Date of Patent: Sep. 5, 1995

[54] SYSTEM FOR COMOUNDING INSTRUCTIONS IN A BYTE STREAM PRIOR TO FETCHING AND IDENTIFYING THE INSTRUCTIONS FOR EXECUTION

[75] Inventors: Richard J. Eickemeyer, Binghamton; Stamatis Vassiliadis, Vestal, both of N.Y.

[73] Assignee: International Business Machines Corporation, Armonk, N.Y.

[21] Appl. No.: 186,218

[22] Filed: Jan. 25, 1994

Related U.S. Application Data

[63] Continuation of Ser. No. 677,066, Mar. 29, 1991, abandoned, which is a continuation-in-part of Ser. No. 519,384, May 4, 1990, abandoned, and Ser. No. 543,458, Jun. 26, 1990, Pat. No. 5,197,135, and Ser. No. 642,011, Jan. 15, 1991, Pat. No. 5,295,249, and Ser. No. 519,382, May 4, 1990, abandoned.

[51] Int. Cl.$^6$ ............................................. G06F 9/38
[52] U.S. Cl. .................................. 395/800; 395/375; 364/230; 364/262.4; 364/236.1; 364/DIG. 1
[58] Field of Search ............... 395/800, 775, 575, 425, 395/375

[56] References Cited

U.S. PATENT DOCUMENTS

| | | | |
|---|---|---|---|
| 4,295,193 | 10/1981 | Pomerene | 395/375 |
| 4,439,828 | 3/1984 | Martin | 395/375 |
| 4,594,655 | 6/1986 | Hao et al. | 395/775 |
| 4,780,820 | 10/1988 | Sowa | 395/800 |
| 4,847,755 | 7/1989 | Morrison et al. | 395/650 |
| 4,975,837 | 12/1990 | Woodnard et al. | 395/375 |
| 5,050,068 | 9/1991 | Dollas et al. | 395/375 |
| 5,086,408 | 2/1992 | Sakator | 395/600 |
| 5,121,493 | 6/1992 | Ferguson | 395/600 |
| 5,197,137 | 3/1993 | Kumar et al. | 395/375 |
| 5,201,057 | 4/1993 | Uht | 395/375 |
| 5,203,002 | 4/1993 | Wetzel | 395/375 |

OTHER PUBLICATIONS

Acosta, R. D., et al., "an Instruction Issuing Approach to Enhancing Performance in Multiple Functional Unit Processors", IEEE Transactions on Computers, Fall, C-35 No. 9, Sep. 1986, pp. 815-828.

Anderson, V. W., et al, The IBM System/360 Model 91: "Machine Philosophy and Instruction Handling", computer structures: Principles and Examples (Siewiorek, et al, ed (McGraw-Hill, 1982, pp. 276-292.

Capozzi, A. J., et al, "Non-Sequential High-Performance Processing" IBM Technical Disclosure Bulletin, vol. 27, No. 5, Oct. 1984, pp. 2842-2844.

Chan, S., et al, "Building Parallelism into the Instruction Pipeline", High Performance Systems, Dec., 1989, pp. 53-60.

(List continued on next page.)

*Primary Examiner*—Alyssa H. bowler
*Assistant Examiner*—Alpesh M. Shah
*Attorney, Agent, or Firm*—Lynn L. Augspurger; Laurence J. Marhoefer

[57] ABSTRACT

A system with an apparatus that can be used in the compounding of instructions for CISC architectures and architectures with other attributes, including RISC. The compounding is performed before instruction execution and it results in a compound instruction program that can be executed in a parallel fashion on appropriate instruction execution hardware. In particular, the proposed apparatus provides compounding capability for architectures that allow the intermingling of instructions and data, contain variable length instructions, and allow modifications of the instruction stream. The system provides for differing and partial reference point information. An embodiment of the proposed apparatus handles the worst-case situation when it is not known which text bytes are instructions and which are data. If some information is known, the system can be simplified. The apparatus as presented provides compounds capability for any number of instructions. The system is developed particularly for machines with a S/370 instruction set, for which a number of examples are given. A backward compounding apparatus is provided. Multiple compound units and logical ORing of sequences provides system support for more difficult organizations.

50 Claims, 14 Drawing Sheets

OTHER PUBLICATIONS

Murakami, K., et al, "SIMP (single Instruction Stream/Multiple Instruction Pipelining): A Novel High-Speed Single Processor Architecture", Proceedings of the Sixteenth Annual Symposium on Computer Architecture, 1989, pp. 78-85.

Smith, J. E., "Dynamic Instructions Scheduling and the Astronautics ZS-1", IEEE Computer, Jul., 1989, pp. 21-35.

Smith, M. D., et al, "Limits on Multiple Instruction Issue", ASPLOS III, 1989, pp. 290-302.

Tomasulo, R. M., "An Efficient Algorithm for Exploiting Multiple Arithmetic Units", Computer Structures, Principles, and Examples (Siewiorek, et al ed), McGraw-Hill, 1982, pp. 293-302.

Wulf, P. S., "The WM Computer Architecture", Computer Architecture News, vol. 16, No. 1, Mar. 1988, pp. 70-84.

Jouppi, N. P., et al, "Available Instruction-Level Parallelism for Superscalar Pipelined Machines", ASPLOS III, 1989, pp. 272-282.

Jouppi, N. P., "the Non-Uniform Distribubion of Instruction-Level and Machine Parallelism and its Effect on Performance", IEEE Transactions on Computers, vol. 38, No. 12, Dec., 1989, pp. 1645-1658.

Ryan, D. E., "Entails 80960: An Architecture Optimized for Embedded Control", IEEE Microcomputers, vol. 8, No. 3, Jun., 1988, pp. 63-76.

Colwell, R. P., et al, "A VLIW Architecture for a Trace Scheduling Compiler", IEEE Transactions on Computers, vol. 37, No. 8, Aug., 1988, pp. 967-979.

Fisher, J. A., "The VLIW Machine: A Multi-Processor for Compiling Scientific Code", IEEE Computer, Jul., 1984, pp. 45-53.

Berenbaum, A. D., "Introduction to the CRISP Instruction Set Architecture", Proceedings of Compcon, Spring, 1987, pp. 86-89.

Bandyopadhyay, S., et al, "Compiling for the CRISP Microprocessor", Proceedings of Compcon, Spring, 1987, pp. 96-100.

Hennessy, J., et al, "MIPS: A VSI Processor Architecture", Proceedings of the CMU Conference on VLSI Systems and Computations, 1981, pp. 337-346.

Patterson, E. A., "Reduced Instruction Set Computers", Communications of the ACM, vol. 28, No. 1, Jan., 1985, pp. 8-21.

Radin, G., "The 801 Mini-Computer", IBM Journal of Research and Development, vol. 27, No. 3, May. 1983, pp. 237-246.

Ditzel, D. R., et al, "Branch Folding in the Crisp Microprocessor: Reducing Branch Delay to Zero", Proceedings of Compcon, Spring 1987, pp. 2-9.

Hwu, W. W., et al, "Checkpoint Repair for High-Performance Out-of-Order Execution Machines", IEEE Transactions on Computers vol. C36, No. 12, Dec., 1987, pp. 1496-1594.

Lee, J. K. F., et al, "Branch Prediction Strategies in Branch Target Buffer Design", IEEE computer, vol. 17, No. 1, Jan. 1984, pp. 6-22.

Riseman, E. M., "the Inhibition of Potential Parallelism by Conditional Jumps", IEEE Transactions on Computers, Dec., 1972, pp. 1405-1411.

Smith, J. E., "A Study of Branch Prediction Strategies", IEEE Proceedings of the Eight Annual Symposium on Computer Architecture, May 1981, pp. 135-148.

Archibold, James, et al, Cache Coherence Protocols: "Evaluation Using a Multiprocessor Simulation Model", ACM Transactions on Computer Systems, vol. 4, No. 4, Nov. 1986, pp. 273-398.

Baer, J. L., et al. "Multi-Level Cache Hierarchies: Organizations, Protocols, and Performance" Journal of Parallel and distributed Computing vol. 6, 1989, pp. 451-476.

Smith, A. J., "Cache Memories", Computing Surveys, vol. 14, No. 3 Sep., 1982, pp. 473-530.

Smith, J. E., et al, "a Study of Instruction Cache Organizations and Replacement Policies", IEEE Proceedings of the Tenth Annual International Symposium on Computer Architecture, Jun., 1983, pp. 132-137.

Vassiliadis, S., et al, "Condition Code Predictory for Fixed-Arithmetic Units", International Journal of Electronics, vol. 66, No. 6, 1989, pp. 887-890.

Tucker, S. G., "The IBM 3090 System: An Overview", IBM Systems Journal, vol. 25, No. 1, 1986, pp. 4-19.

IBM Publication No. SA22-7200-0, Principles of Operation, IBM Enterprise Systems Architecture/370, 1988.

The Architecture of Pipelined Computers, by Peter M. Kogge hemisphere Publishing Corporation, 1981.

IBM Technical Disclosure Bulletin (vol. 33 No. 10A, Mar. 1991), by R. J. Eberhard.

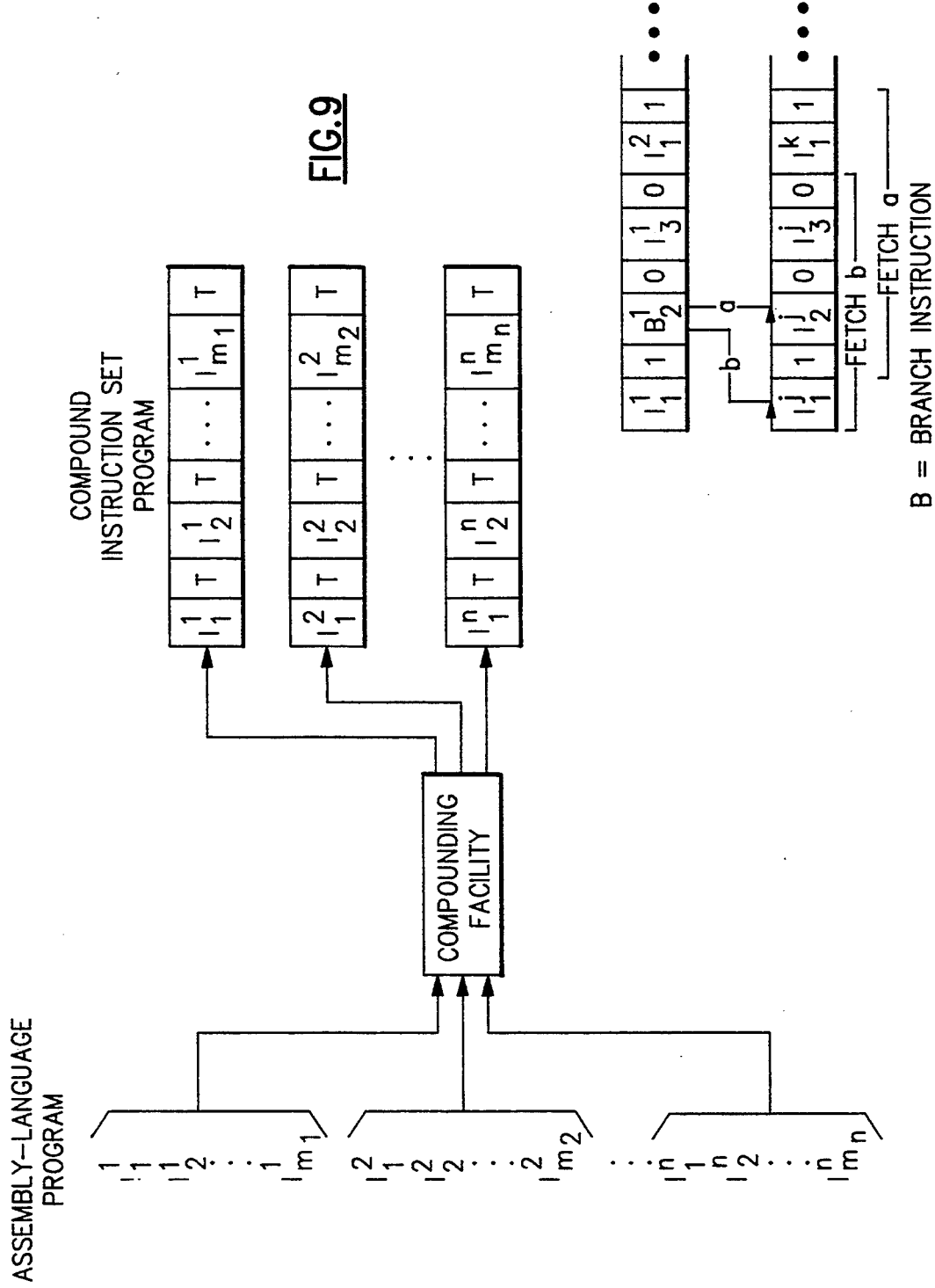

```
BYTE           0  2  4  6  8  10 12 14 16 18 20 22 24

SEQUENCE      | 6    |  | 2| 2|  4|  | 2|  6   |  | 2| 2|

C-VECTOR      | 0| 0| 0| 1| 0| 1| 0| 0| 0| 0| 0| 1| 0|
```

BYTE     =   TEXT ENUMERATION
SEQUENCE =   PROGRAM INSTRUCTION LENGTH SEQUENCE
C-VECTOR =   COMPOUNDING BITS FOR EVERY TWO BYTES

```
LENGTHS     |6|2|4|2|2|4|4|2|6|4|2|2|2|
BYTE         0 2 4 6 8 10 12 14 16 18 20 22 24
                        (a)

SEQUENCE 1  |6    |2|2|4  |2|6      |2|2|

C-VECTOR    |0|0|0|1|0|1|0|0|0|0|0|1|0|

SEQUENCE 2  |2|4  |2|4  |2|6      |2|2|

C-VECTOR    |1|0|0|1|0|0|0|0|0|0|0|1|0|

SEQUENCE 3  |4    |2|4  |2|6      |2|2|

C-VECTOR    |1|0|0|1|0|0|0|0|0|0|0|1|0|
                        (b)

CC-VECTOR   |0|1|1|1|1|1|0|0|0|0|0|1|0|
                        (c)
```

LENGTHS   = INSTRUCTION LENGTH CODE FOR EACH TWO BYTES
BYTE      = TEXT ENUMERATION
SEQUENCE  = POTENTIAL PROGRAM INSTRUCTION LENGTH SEQUENCE
C-VECTOR  = COMPOUNDING BITS FOR EVERY TWO BYTES
CC-VECTOR = COMPOSITE COMPOUNDING BITS FOR EVERY TWO BYTES

FIG.12

LENGTHS = INSTRUCTION LENGTH CODE FOR EACH TWO BYTES
BYTE = TEXT ENUMERATION
C-VECTOR = COMPOUNDING BITS EVERY TWO BYTES OF TEXT UNDER CONSIDERATION
CC-VECTOR = COMPOSITE COMPOUNDING BITS FOR EVERY TWO BYTES OF TEXT

LENGTHS = INSTRUCTION LENGTH CODE FOR EACH TWO BYTES
BYTE = TEXT ENUMERATION
SEQUENCE = PROGRAM INSTRUCTION LENGTH SEQUENCE
C-VECTOR = COMPOUNDING BITS FOR EVERY TWO BYTES OF TEXT UNDER CONSIDERATION
CC-VECTOR = COMPOSITE COMPOUNDING BITS FOR EVERY TWO BYTES

SYSTEM FOR COMOUNDING INSTRUCTIONS IN A BYTE STREAM PRIOR TO FETCHING AND IDENTIFYING THE INSTRUCTIONS FOR EXECUTION

CROSS-REFERENCE TO RELATED APPLICATIONS

This application is a continuation of application Ser. No. 07/677,066, filed Mar. 29, 1991, now abandoned, which claims priority and U.S. application continuation-in-part status continuing U.S. Ser. No. 07/519,384 filed May 4, 1990, now abandoned, and U.S. Ser. No. 07/543,458 filed Jun. 26, 1990, now U.S. Pat. No. 5,197,135, and U.S. Ser. No. 07/642,011 filed Jan. 15, 1991, now U.S. Pat. No. 5,295,249 and U.S. Ser. No. 07/519,382 filed May 4, 1990, now abandoned.

The present U.S. patent application is related to the following co-pending U.S. patent applications:

(1) Application Ser. No. 07/519,382 (IBM Docket EN9-90-020), filed May 4, 1990, now abandoned, entitled "Scalable Compound Instruction Set Machine Architecture", the inventors being Stamatis Vassiliadis et al; and (2) Application Ser. No. 07/519,384 (IBM Docket EN9-90-019), filed May 4, 1990, now abandoned, entitled "General Purpose Compound Apparatus For Instruction-Level Parallel Processors", the inventors being Richard J. Eickemeyer et al; and (3) Application Ser. No. 07/504,910 (IBM Docket EN9-90-014), filed Apr. 4, 1990, now U.S. Pat. No. 5,051,940, entitled "Data Dependency Collapsing Hardware Apparatus", the inventors being Stamatis Vassiliadis et al; and (4) Application Ser. No. 07/522,219 (IBM Docket EN9-90-012), filed May 10, 1990, now U.S. Pat. No. 5,035,375, entitled "Compounding Preprocessor For Cache", the inventors being Bartholomew Blaner et al; and (5) Application Ser. No. 07/543,464 (IBM Docket EN9-90-018), filed Jun. 26, 1990, now abandoned, entitled "An In-Memory Preprocessor for a Scalable Compound Instruction Set Machine Processor", the inventors being Richard Eickemeyer et al; and (6) Application Ser. No. 07/543,458 (IBM Docket EN9-90-042), filed Jun. 26, 1990, now U.S. Pat. No. 5,197,135, entitled "Memory Management for Scalable Compound Instruction Set Machines With In-Memory Compounding", the inventors being Richard J. Eickemeyer et al; and (7) Application Ser. No. 07/619,868 (IBM Docket EN9-90-033), filed Nov. 28, 1990, now U.S. Pat. No. 5,301,341, entitled "Overflow Determination for Three-Operand ALUS in a Scalable Compound Instruction Set Machine", the inventors being Stamatis Vassiliadis et al; and (8) Application Ser. No. 07/642,011 (IBM Docket EN9-90-049), filed Jan. 15, 1991, now U.S. Pat. No. 5,295,249, entitled "Compounding Preprocessor for Cache", the inventors being Stamatis Vassiliadis et al; and (9) Application Ser. No. 07/677,685 (IBM Docket EN9-90-040), filed Mar. 29, 1991, now U.S. Pat. No. 5,303,356, entitled "System for Preparing Instructions for Instruction Processor and System With Mechanism for Branching in the Middle of a Compound Instruction", the inventors being S. Vassiliadis et al.

These co-pending applications and the present application are owned by one and the same assignee, namely, International Business Machines Corporation of Armonk, N.Y. The descriptions set forth in these co-pending applications are hereby incorporated into the present application by this reference thereto.

A review of these related cases will show that we have illustrated FIGS. 1-2 in U.S. Ser. No. 07/519,384 filed May 4, 1990, now abandoned, while FIG. 3 may also be found described in U.S. Ser. No. 07/543,458 filed Jun. 26, 1990, now U.S. Pat. No. 5,197,135 and FIG. 4-B has been generally described in U.S. Ser. No. 07/642,011 filed Jan. 15, 1991, now U.S. Pat. No. 5,295,249 while FIGS. 5-7 were also illustrated in U.S. Ser. No. 07/519,382 filed May 4, 1990, now abandoned.

FIELD OF THE INVENTION

This invention relates to digital computers and digital data processors, and particularly to digital computers and data processors capable of executing two or more instructions in parallel, and details the system and techniques for compounding instructions for a variety of instruction processors, including processors which use an architecture which processes instructions and data separately, processors which allow instructions and data to be mixed, those with and without reference indications identifying instructions and provides a backward compounding apparatus for compounding instructions which can be of a variable word length. In addition, compounding for pair and more extensive multiple instructions are provided.

BACKGROUND OF THE INVENTION

Traditional computers which receive a sequence of instructions and execute the sequence one instruction at a time are known. The instructions executed by these computers operate on single-valued objects, hence the name "scalar" for these computers.

The operational speed of traditional scalar computers has been pushed to its limits by advances in circuit technology, computer mechanisms, and computer architecture. However, with each new generation of competing machines, new acceleration mechanisms must be discovered for traditional scalar machines.

A recent mechanism for accelerating the computational speed of uni-processors is found in reduced instruction set architecture that employs a limited set of very simple instructions. Another acceleration mechanism is complex instruction set architecture which is based upon a minimal set of complex multi-operand instructions. Application of either of these approaches to an existing scalar computer would require a fundamental alteration of the instruction set and architecture of the machine. Such a far-reaching transformation is fraught with expense, downtime, and an initial reduction in the machine's reliability and availability.

In an effort to apply to scalar machines some of the benefits realized with instruction set reduction, so-called "superscalar" computers have been developed. These machines are essentially scalar machines whose performance is increased by adapting them to execute more than one instruction at a time from an instruction stream including a sequence of single scalar instructions. These machines typically decide at instruction execution time whether two or more instructions in a sequence of scalar instructions may be executed in parallel. The decision is based upon the operation codes (OP codes) of the instructions and on data dependencies which may exist between instructions. An OP code signifies the computational hardware required for an instruction. In general, it is not possible to concurrently execute two or more instructions which utilize the same hardware (a hardware dependency) or the same operand (a data dependency). These hardware and data dependencies prevent the parallel execution of some instruction combinations. In these cases, the affected instructions are executed serially. This, of course, reduces the performance of a super scalar machine.

Superscalar computers suffer from disadvantages which it is desirable to minimize. A concrete amount of time is consumed in deciding at instruction execution time which instructions can be executed in parallel. This time cannot be readily masked by overlapping with other machine operations. This disadvantage becomes more pronounced as the complexity of the instruction set architecture increases. Also, the parallel execution decision must be repeated each time the same instructions are to be executed.

In extending the useful lifetime of existing scalar computers, every means of accelerating execution is vital. However, acceleration by means of reduced instruction set architecture, complex instruction set architecture, or superscalar techniques is potentially too costly or too disadvantageous to consider for an existing scalar machine. It would be preferred to accelerate the speed of execution of such a computer by parallel, or concurrent, execution of instructions in an existing instruction set without requiring change of the instruction set, change of machine architecture, or extension of the time required for instruction execution.

SUMMARY OF THE INVENTION

Here and in the referenced applications we have detailed inventions which relate to compounding of instructions for instruction processors with the premise that these systems and techniques would allow enhancement and further development of existing processors, while enabling the further enhanced processors to execute more efficiently code which had been developed for their predecessors. However, while we will highlight the background of these developments as detailed herein, it should be recognized that in all of these developments described elsewhere by ourselves and others there is, without the benefit of the inventions described herein, an unfulfilled need to determine in the processing of a set of instructions or program to be executed by a computer how instructions may be combined into compound instructions for various possible architectures to which the inventions are applicable. Today there are many kinds of architectures, including RISC and S/370, and some have data mixed with instructions, some don't, some have variable length instructions, some don't. Some future machine may process only two parallel instructions while others can process longer instructions. These differences require solution to a number of problems which have been solved by the inventions addressed and detailed herein.

It is to this object that the inventions which are here stated are addressed as a system which enables original programs to be processed as parallel and single instructions as fits the original program functions which are implemented for execution by a machine capable of instruction parallel processing. We have provided a way for existing programs written in existing high level languages or existing assembly language program to be processed by a pre-processor which can identify sequences of instructions which can be executed as a single compound instruction in a computer designed to execute compound instructions as instructions in parallel.

The instruction processor provides compounding decoding for a series of base instructions of a scalar machine, generates a series of compound instructions, provides for fetching of the compound instructions and for decoding the fetched compound instructions and necessary single instructions, and provides a compound instruction program which preserves intact the scalar execution of the base instructions of a scalar machine when the program with compound instructions is executed on the system. This system also provides a mechanism for branching in the middle of a compounding instruction. For branching in the middle of a compound instruction, compound instructions are examined for appended control bits. A nullification mechanism is provided for nullifying execution of an instruction unit of a compound instruction which would affect the correctness if there were branching in the middle of the compound instruction which would wrongly affect a recorded result dependent upon the interrelationship of the program.

The inventions detailed herein teach in what manner there shall be accomplished the appending of control information to the instructions in the program to be executed where the base architecture has different attributes. It is to this object that the inventions which are here stated are addressed. We have provided a way for existing programs written in existing high level languages or existing assembly language program to be processed by software which can identify sequences of instructions which can be executed as a single compound instruction in a computer designed to execute compound instructions.

While the base apparatus for performing the compounding disclosed herein has been detailed in the aforesaid co-pending applications which relate to scalable compound instruction set machines, difficult problems exist in implementing compounding on systems. After detailing the base system which we prefer in the detailed description we will describe herein the advances interrelated the system hardware and compounding facility so as to make it applicable to a wide variety of systems, one of which is the IBM s/370 architecture which may act as an originating base instruction processor which then may be used together with successors having overlapping instruction sets within the architecture. Thus the newer instruction processor may have a particular set of compounding rules, as is contemplated in connection with the present system. The problems which we address for general compounding deal with the manner in which incoming instructions and data are processed as a continuing byte stream examined by the compounding facility which creates a compound instruction set program for running on an instruction processor. In order to solve some problems which may be encountered we have created a new system hardware here detailed for handling architectures with different attributes and those processing text with data, and having differing and partial reference point information with the apparatus which we will describe in detail herein.

We describe in this summary the kinds of interrelationships we discovered and dealt with in creating the new system which we describe in the detailed description which follows. Our work has resulted in solutions for systems which now use different architectures.

One such system may be a system where a byte string to be compounded is such that it is known that there are no data bytes in the instruction string, and when the location of a reference point, such as the opcode of the first instruction, is known. This kind of system is today typically a RISC architecture machine, but other specific cases may exist. The situation may result from the specific compiler which is used to compile an original program. In addition, the techniques which we describe to solve this program when used as a useful assumption in a shod section of text.

Our solution to this problem became a best case solution as the result of the techniques and system utilization also solves a case where both instructions and data are in the original text byte stream, but they are at known boundaries.

Accordingly we have provided a system with architectural compounding rules in which classes of instructions which may be compounded for a particular architecture are provided, and We apply applicable compounding rules to a byte stream of instructions of a base instruction sequence, and examine the base instruction sequence byte stream for opcodes and proceed through the stream while applying the compounding rules. During this compounding operation an instruction compounding unit of the compounding facility identifies each instruction after examining the instruction length code, and generates tag bit information for a compound instruction which indicates the initial compound instruction of a set of compounded instructions, and as the compounding facility continues compounding its output provides a compound sequence of compound instructions as a compound program. This is used by the instruction processor to allow execution of member units of a compound instruction in parallel, instructions which in prior machines would have been executed as scalar instructions, while handling the problems associated with mixed data and instructions, unknown boundaries by classical means, and other problems encountered by the more sophisticated architectures of our age.

In some situations, halfwords which exist in an instruction are initialized to indicate that the halfword is not an initial compound instruction. Best pairs are picked for compounding according to said compounding rules. As we have discovered there are situations which occur which preclude compounding, the system employs a technique for choosing instructions for compounding includes instructions which cannot be compounded and certain instructions which are examined are tagged to indicate that a specific instruction is not an initial instruction, and in the event that the initial instruction of the set being examined is not an appropriate as an initial compound instruction marking that instruction that it is not an initial instruction. The system proceeds to examine a subsequent group of instructions which includes the next sequential instruction in the group which had just been examined.

When instructions are mixed with non-instructions or data the system marks every halfword either as containing the first byte of an instruction or as an instruction not containing the first byte of a compound instruction, and skipping over in the compounding process the instruction marked as not containing the first bite of a compound instruction.

It will be recognized upon reading the detailed description what occurs in the system where there are compound instructions without a reference point, a case where compounding becomes more complex. In the event where in the base instruction set stream being examined are the boundaries of instructions members to be compounded, each with a plurality of possible sequences of instructions, then for each sequence possible boundaries are determined, and the the plural sequence are reduced to a single sequence of bits by our new hardware for logically ORing the plurality of possible sequences.

Typically in S/370 type systems there are three possible sequences of instructions with potential boundaries, each of which would produce a different sequence of compounding bits, and so the new system accommodates three bit sequences which are logically ORed to produce a single sequence to determine whether the current instruction is compounded by the instruction processor.

We have provided the system for compounding which experimentally tries the several possible sequences for convergence on a byte boundary, and when a convergence is detected, one of the converging sequences is eliminated until the number of sequences is collapsed until a single sequence remains.

A second higher level problem which has to be recognized is that in machines having a non-RISC architecture it is possible to has instructions and data intermixed in a byte stream, so that the compound instruction byte stream can be compounded correctly without additional information. This we consider to be be worst case, one that can occur if a byte stream of mixed instructions and data exists and there is no knowledge of where any instruction begins. The hardware which we provide accommodates this kind of system. As in the prior more general example, there is a convergence testing, and, if a convergence occurs and a sequence is eliminated by convergence, a new sequence is started in place of a sequence eliminated by convergence. Again here a sequence is started at every halfword. A set of instructions are examined and compounding bits are determined, and this examination process is repeated starting a number of bytes in sequence later, and compounding bits from each sequence are ORed to form a composite compound bit instruction.

In addition, more advanced instruction processor architectures such as those of the IBM S/370 type can process instructions where instructions have a variable length. Compounding instructions to form programs for more advanced machines of this architecture is difficult, and may be considered as exemplary of the highest order worst case because it is not apparent how the beginning of an instruction in a string of bytes can be identified even though it may be known that the string contains only instructions. Such a situation is characteristic of the current S/370 instruction processors, because such instruction processors have provision for identifying instructions in cache during the process of instruction fetch.

In our described preferred system, like the S/370 there is provided a compounding facility with a cache, and the system which we prefer has a cache and provides for a cache miss or a branch to a part of a line not yet compounded that a plurality of instructions are provided to the central processing unit via said instruction program without compounding of the instructions.

Such a S/370 system architecture compounding facility examines a byte stream and, upon encountering data, it will compound data as if the data consisted of instructions, but an S/370 architecture machine will have an instruction processor which cannot execute data and accordingly will execute a compound instruction program correctly. Instructions which are examined are tagged to indicate that a specific instruction is not an initial instruction, and in the event that the initial instruction of the set being examined is not an appropriate as an initial compound instruction marking that instruction that it is not an initial instruction, the detailed system examines a subsequent group of instructions which includes the next sequential instruction in the group which had just been examined. The compounding facility skips over in the compounding process the instruction marked as not containing the first byte of a compound instruction.

Another technique we have also discovered is how to compound instructions without a reference point, a case where compounding becomes more complex. S/370 type processors may have reference points, but programs contemplating variable length instructions are possible and so no reference point for an initial instruction may be present. In the event it is not known where in the base instruction set stream being examined is an instruction boundary and there are a plurality of possible sequences of instructions, each sequence is processed with compounding facility hardware for possible boundaries which are determined, and the the plural sequences obtained which are reduced to a single sequence of bits by logically ORing the plurality of possible sequences. Preferably for a S/370 type instruction processor the system will result in three bit sequences which are logically ORed to produce a single sequence to determine whether the current instruction is compounded by the instruction processor as detailed herein.

Using the base central processing unit for the compounding facility, during a process of fetching instructions from memory, wherein upon retrieval and before examination they are marked as instructions and not data. Furthermore, the compounding facility provides compound bits of an instruction which indicate the number of instructions which make up a compound group instruction. This enables us to handle multiple unit compound instructions for more advanced machines, and not just pairs. In each compound instruction the tag information provided for the compound instruction has bit information applicable to a member instruction unit of the compound instruction so as to indicating whether or not that particular member unit is to be compounded with a subsequent instruction.

There are also additional alternate embodiments which can be incorporated in the system. The system instruction processor central processor during execution may ignore all but tag information of a first instruction member of a compound instruction. During examination bytes not executed can be marked as not examined in which case they will be reexamined could the code be later executed by the instruction processor. During examinations bytes not executed can be left in an examined state, indicating the correctness of location even though they may be ignored or not executed during execution. During examination bytes can be left in a partially examined sequence state for examination of other sequences later.

These and other improvements are detailed in the following detailed description. For a better understanding of the inventions, together with advantages and features, reference be had to the co-pending applications for some detailed background. Further, specifically as to the improvements described herein reference should be made to the following description and the below-described drawings.

BRIEF DESCRIPTION OF THE DRAWINGS

For a better understanding of the invention, together with its advantages and features, reference be had to the co-pending applications for some detailed background. Further, specifically as to the improvements described herein reference should be made to the following description and the below-described drawings.

BRIEF DESCRIPTION OF THE DRAWINGS

Figure 1:
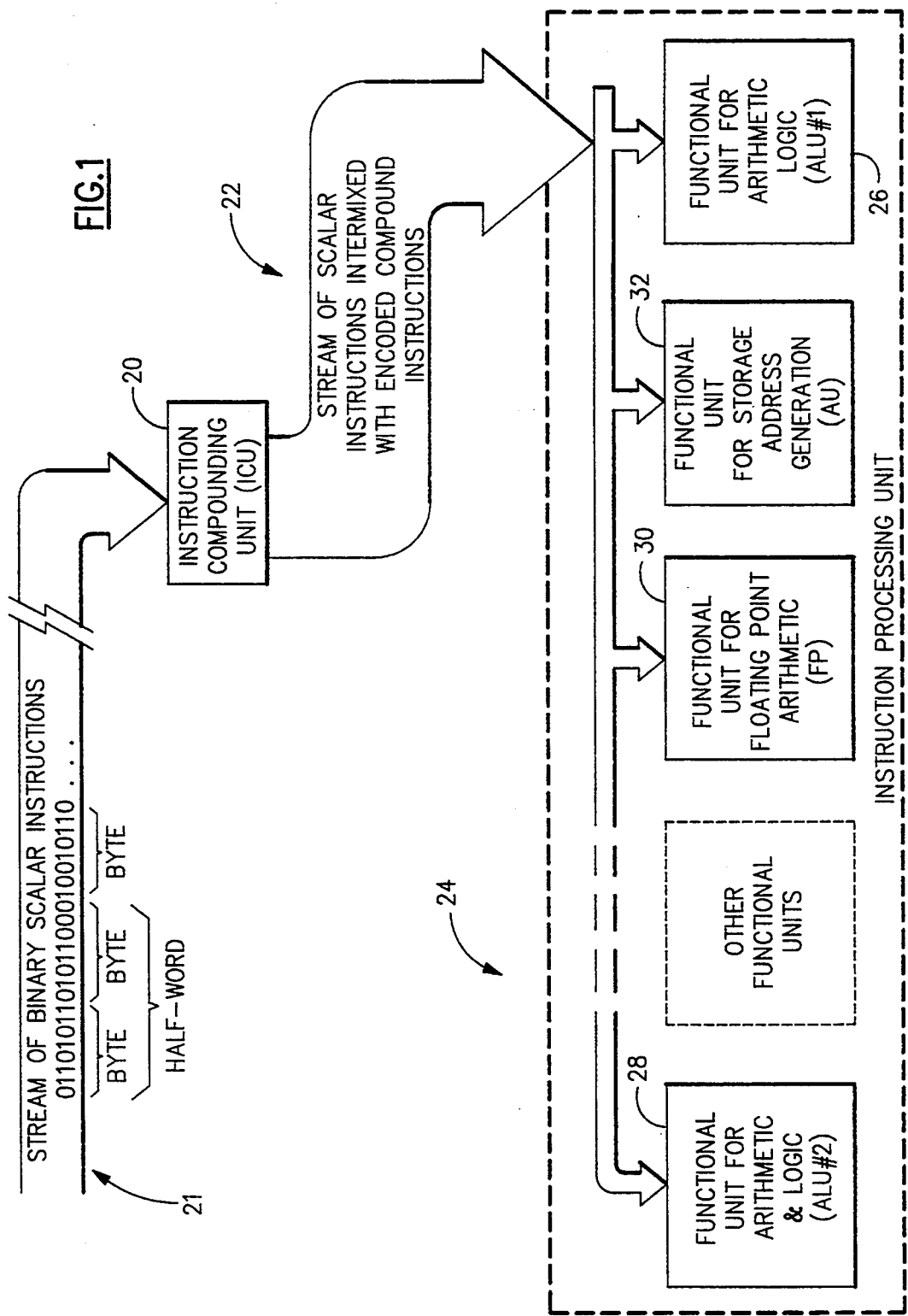

FIG. 1 is high-level schematic diagram of a computing system which is capable of compounding instructions in a sequence of scalar instructions for concurrent execution.

Figure 2:
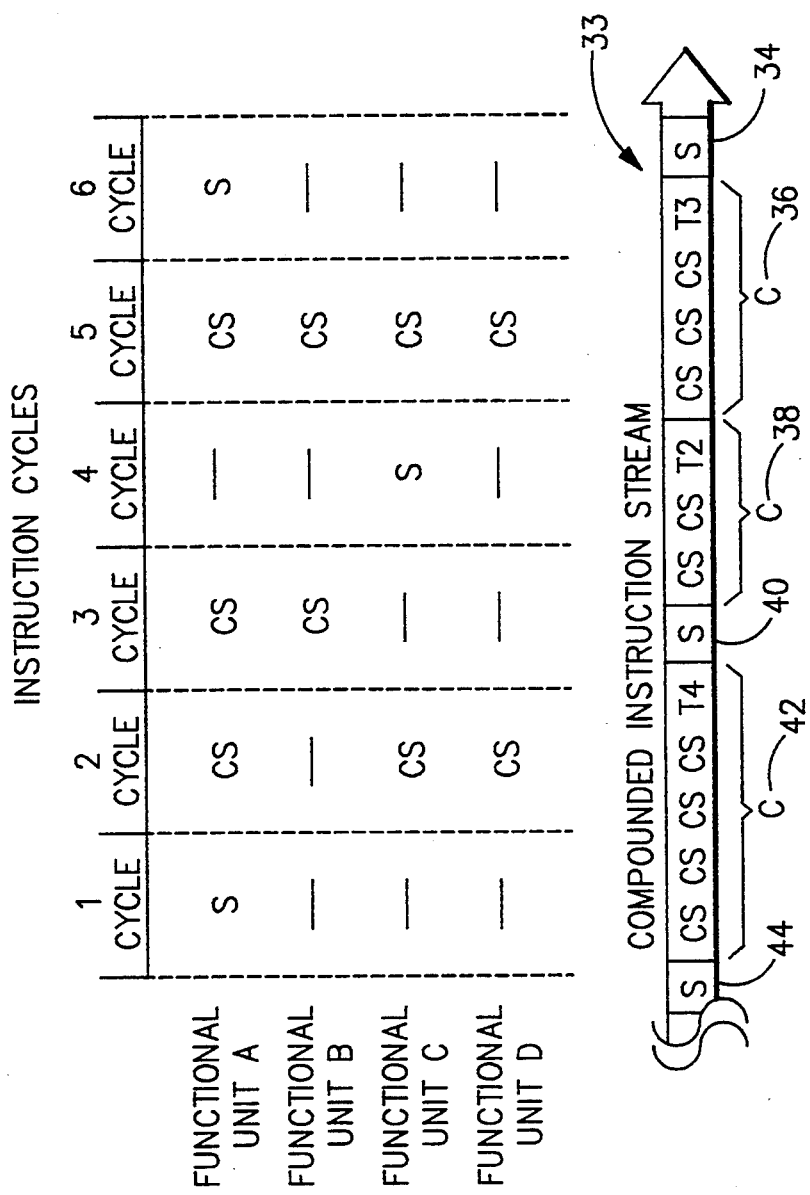

FIG. 2 is a timing diagram for a uni-processor implementation showing the parallel execution of certain instructions which have been selectively grouped in a compound instruction stream.

Figure 3:
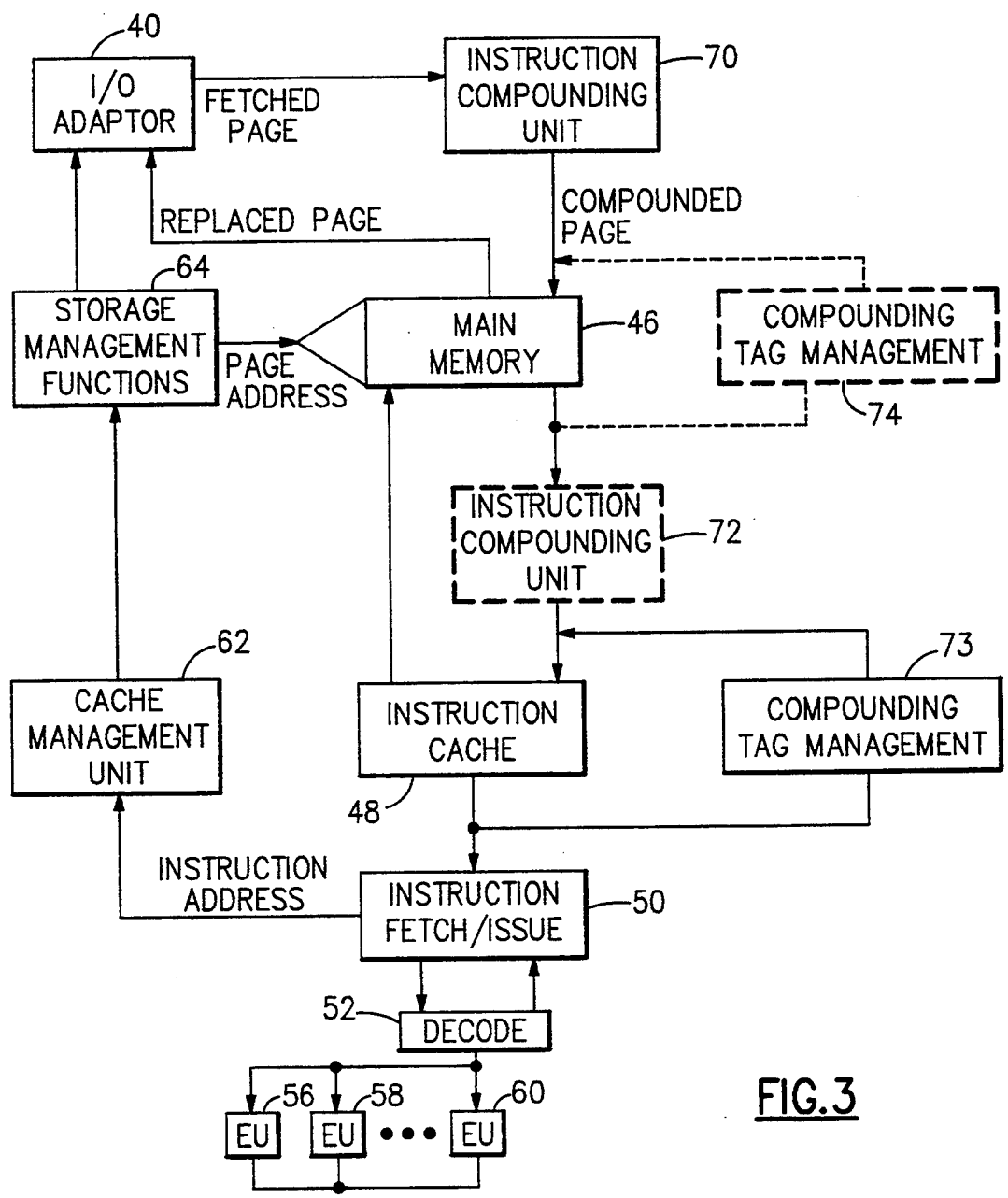

FIG. 3 is a block diagram of a hierarchical memory organization in a scalable compound instruction set machine with in-memory processing shown as an alternative preferred embodiment for the operational environment.

Figure 4A:
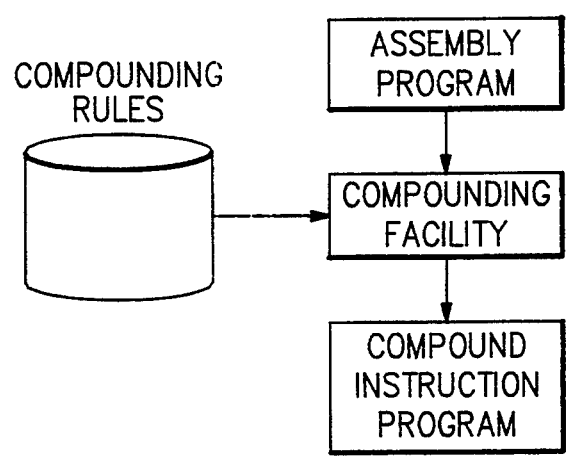
Figure 4B:
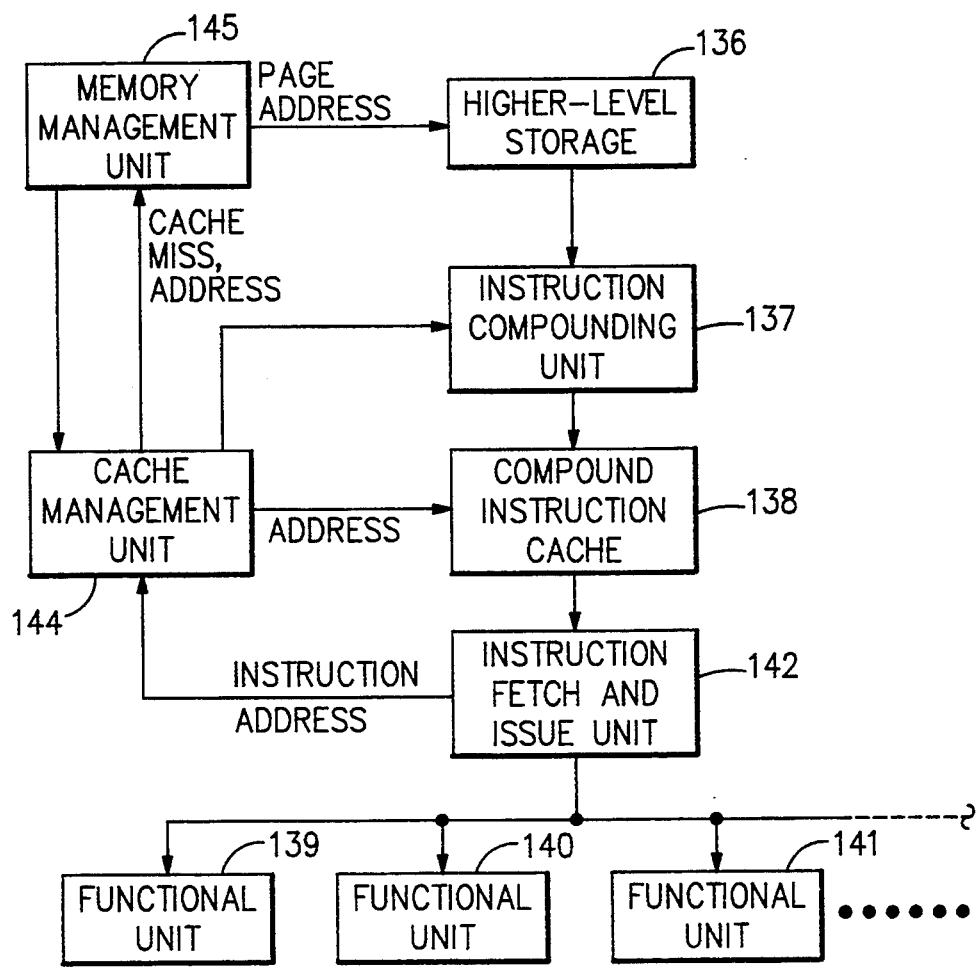

FIG. 4-A is a high level schematic diagram of the process which will be described pictorially for providing means for processing existing programs to identify sequences of instructions which can be executed as a single compound instruction in a computer designed to execute compound instructions, while FIG. 4-B illustrates the preferred operational environment of the inventions and the inventions' location in the environment.

Figure 5:
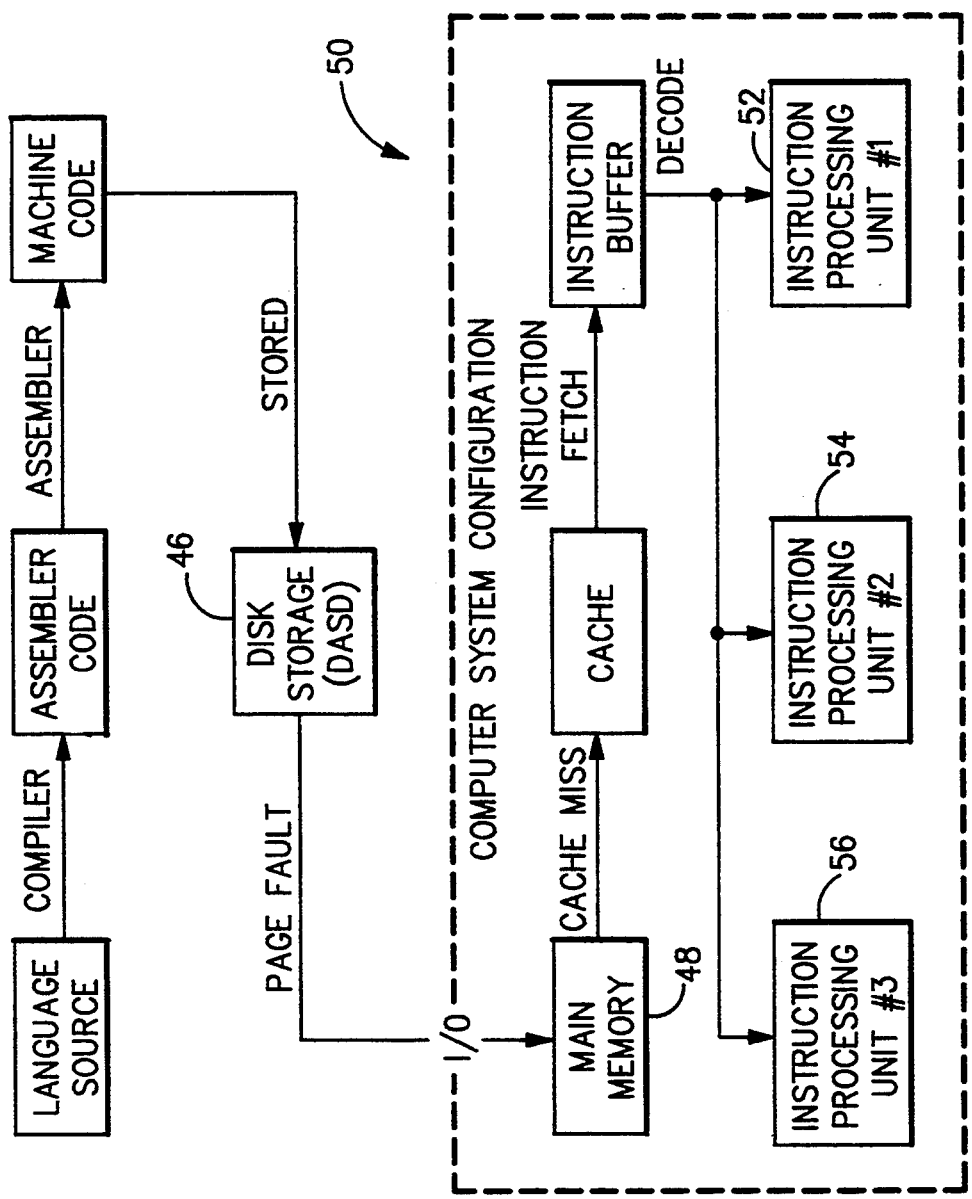

FIG. 5 shows a path taken by a program from original program code to actual execution.

Figure 6:
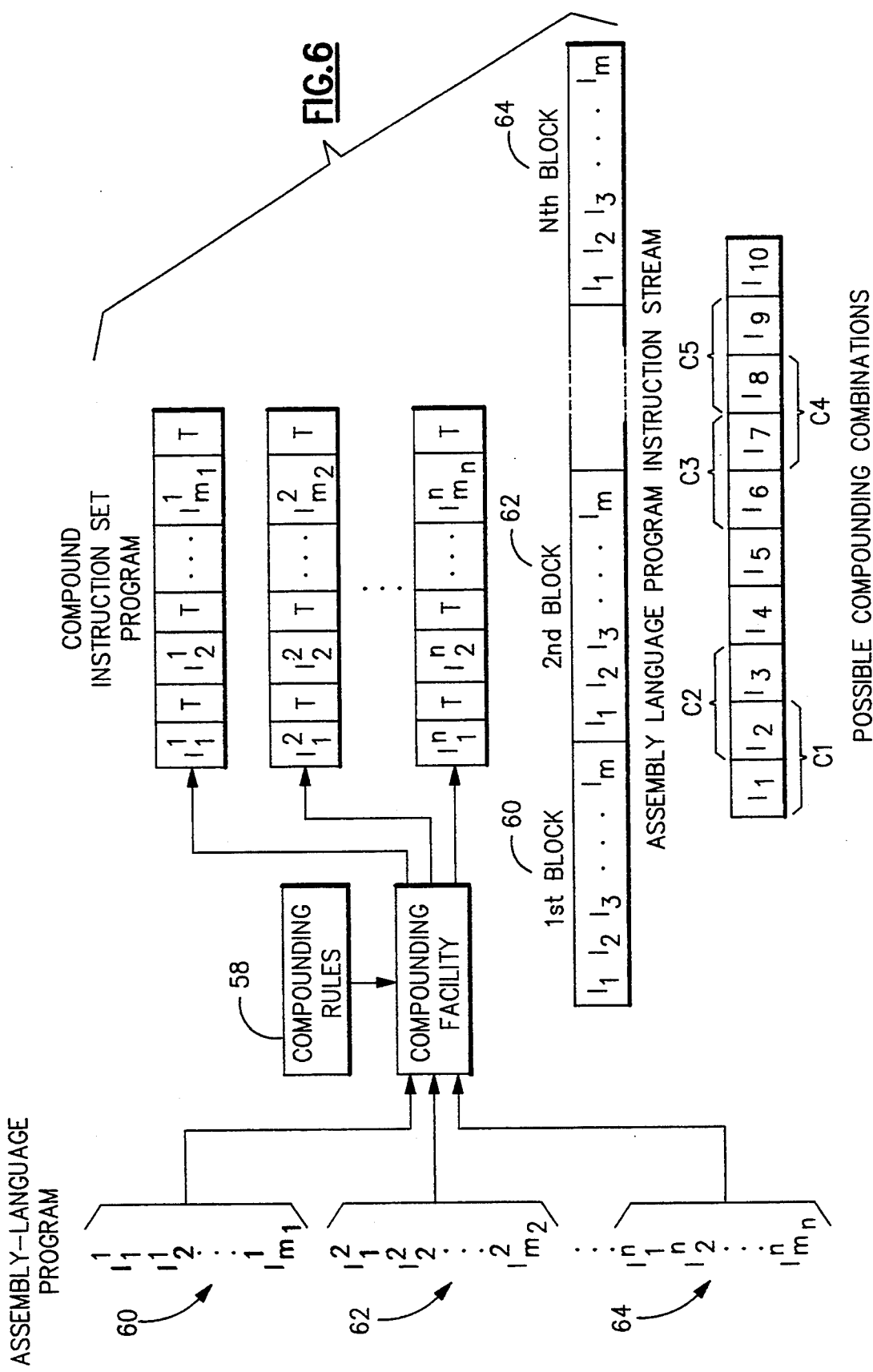
Figure 7:
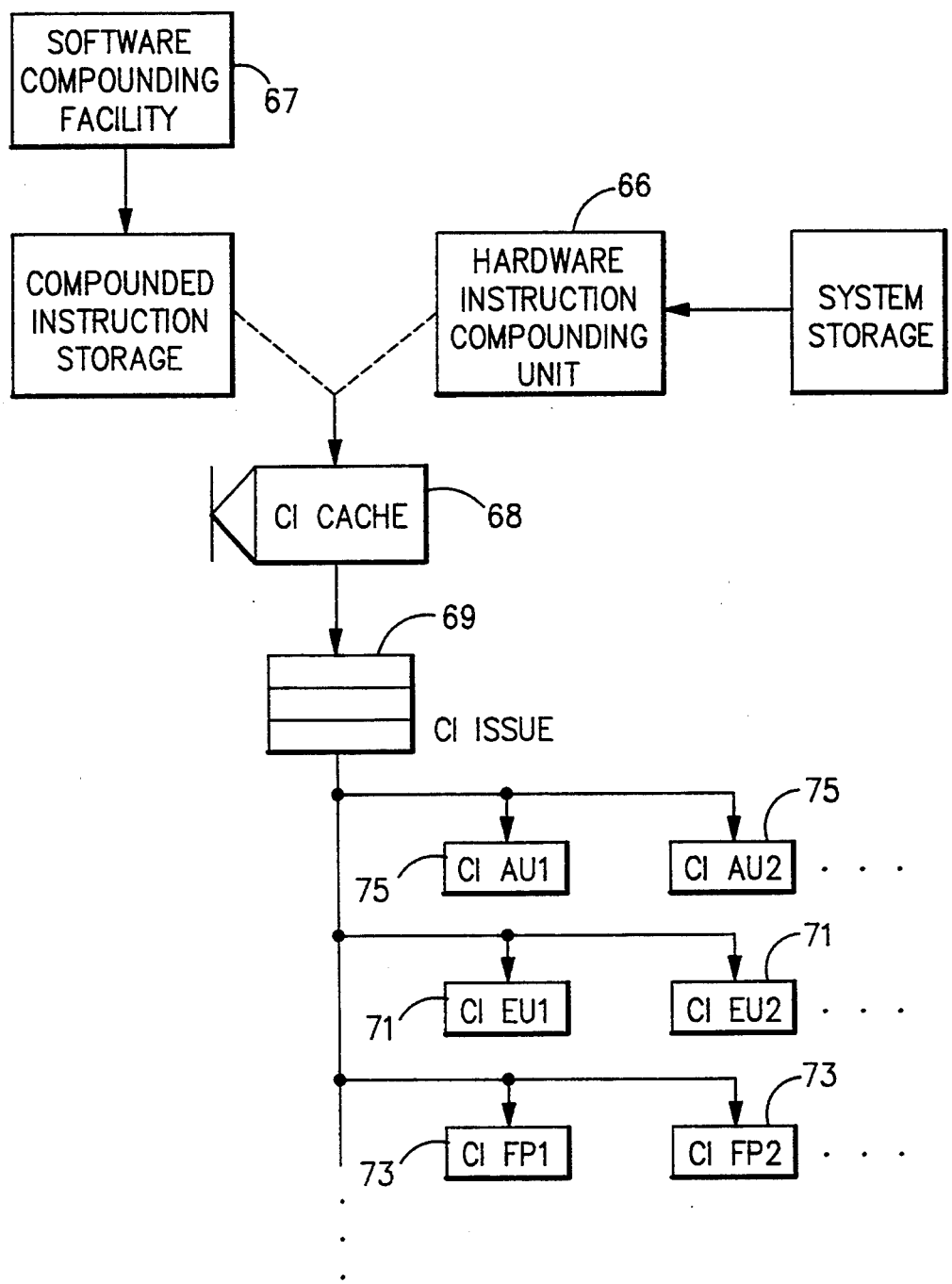

FIG. 6 is a flow diagram showing generation of a compound instruction set program from an assembly language program; while FIG. 7 is a flow diagram showing execution of a compound instruction set.

Figure 8:
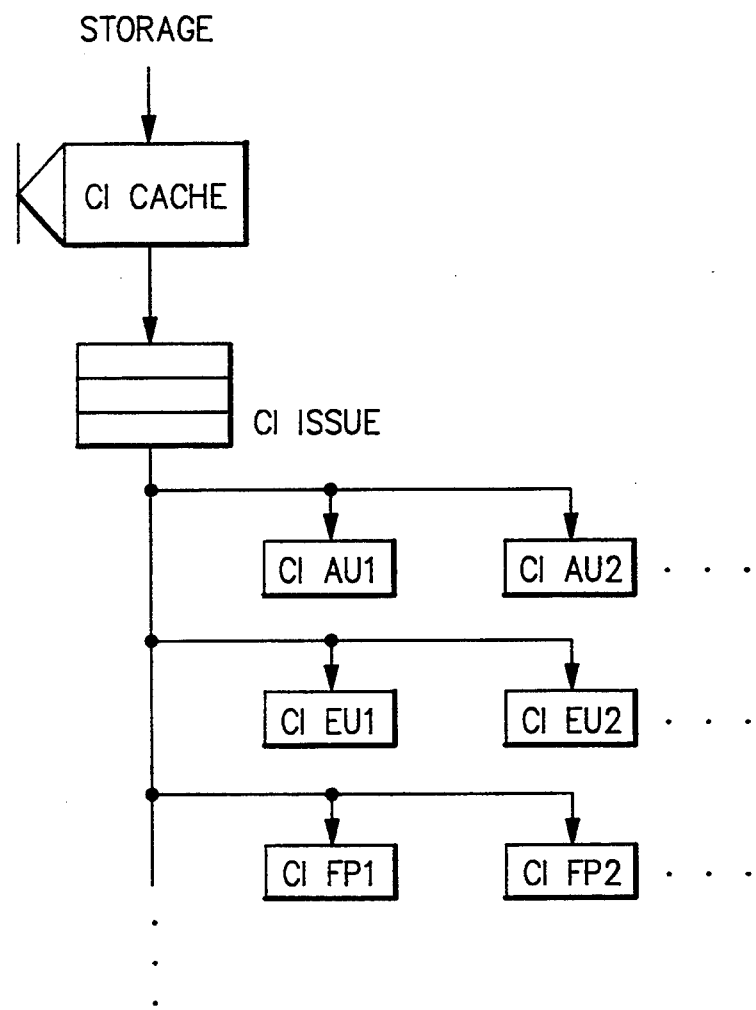

FIG. 8 illustrates a compound instruction execution engine.

FIG. 9 illustrates a compound instruction program.

FIG. 10 illustrates a situation where branch target may be at the beginning or middle of a compound instruction.

Figures 11, 14:

FIG. 11 illustrates an example of the best case for compounding.

FIG. 12 illustrates an example with a reference point.

Figure 13:
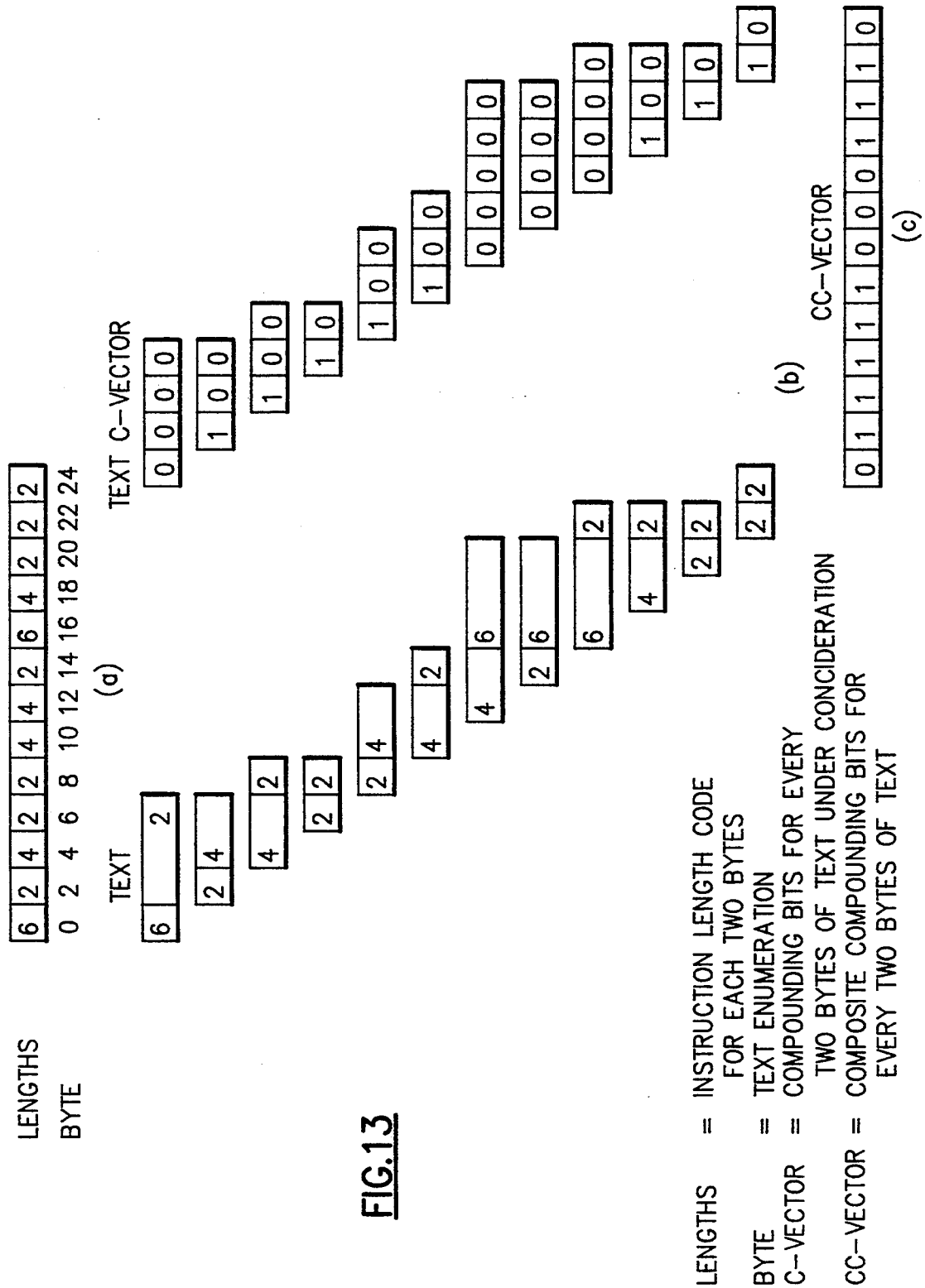

FIG. 13 illustrates an example of compounding for the worst case in accordance with the preferred embodiment.

FIG. 14 illustrates the logical and hardware implementation of the worst case compounder.

Figure 15:
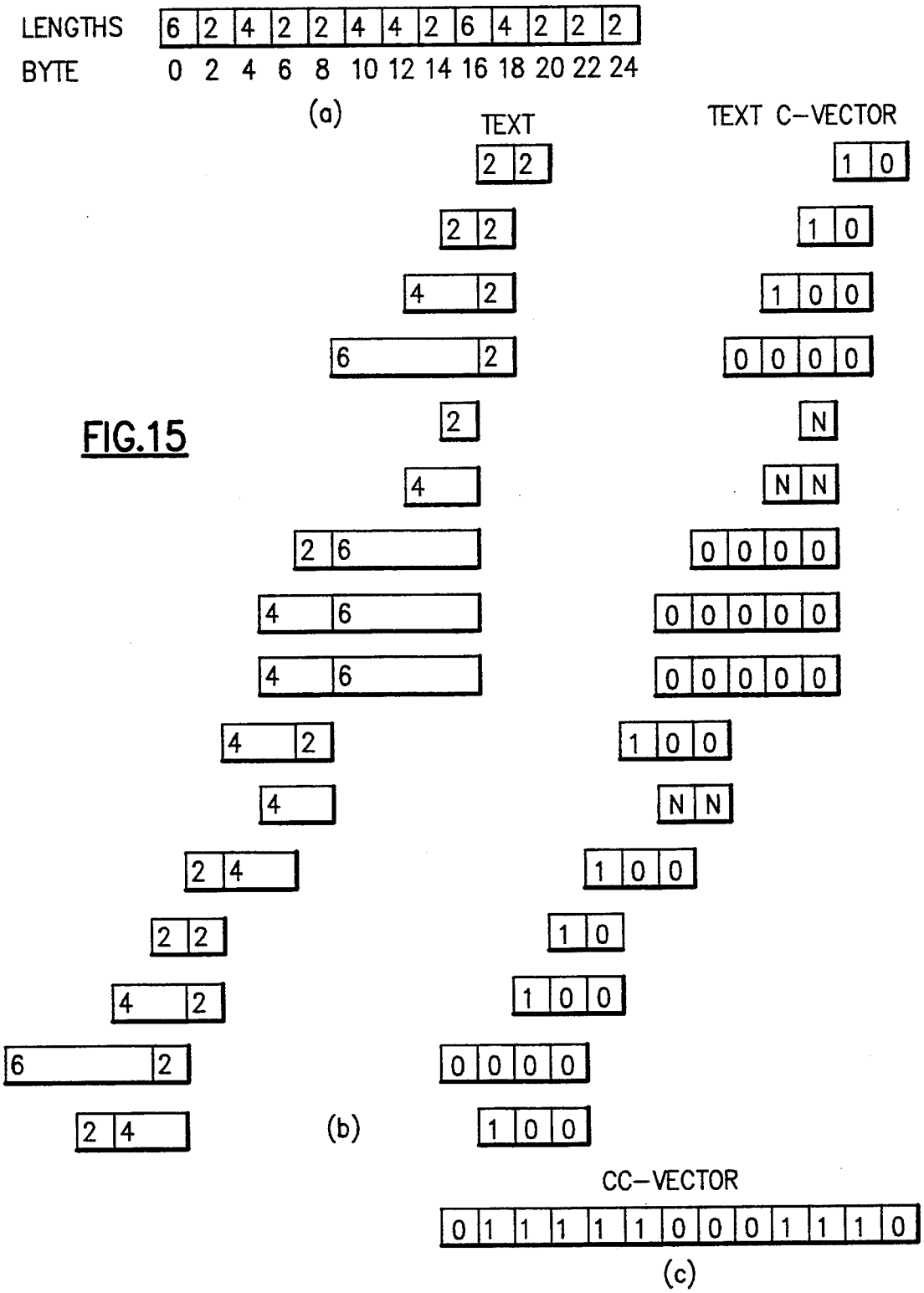

FIG. 15 illustrates backward compounding.

Figure 16:
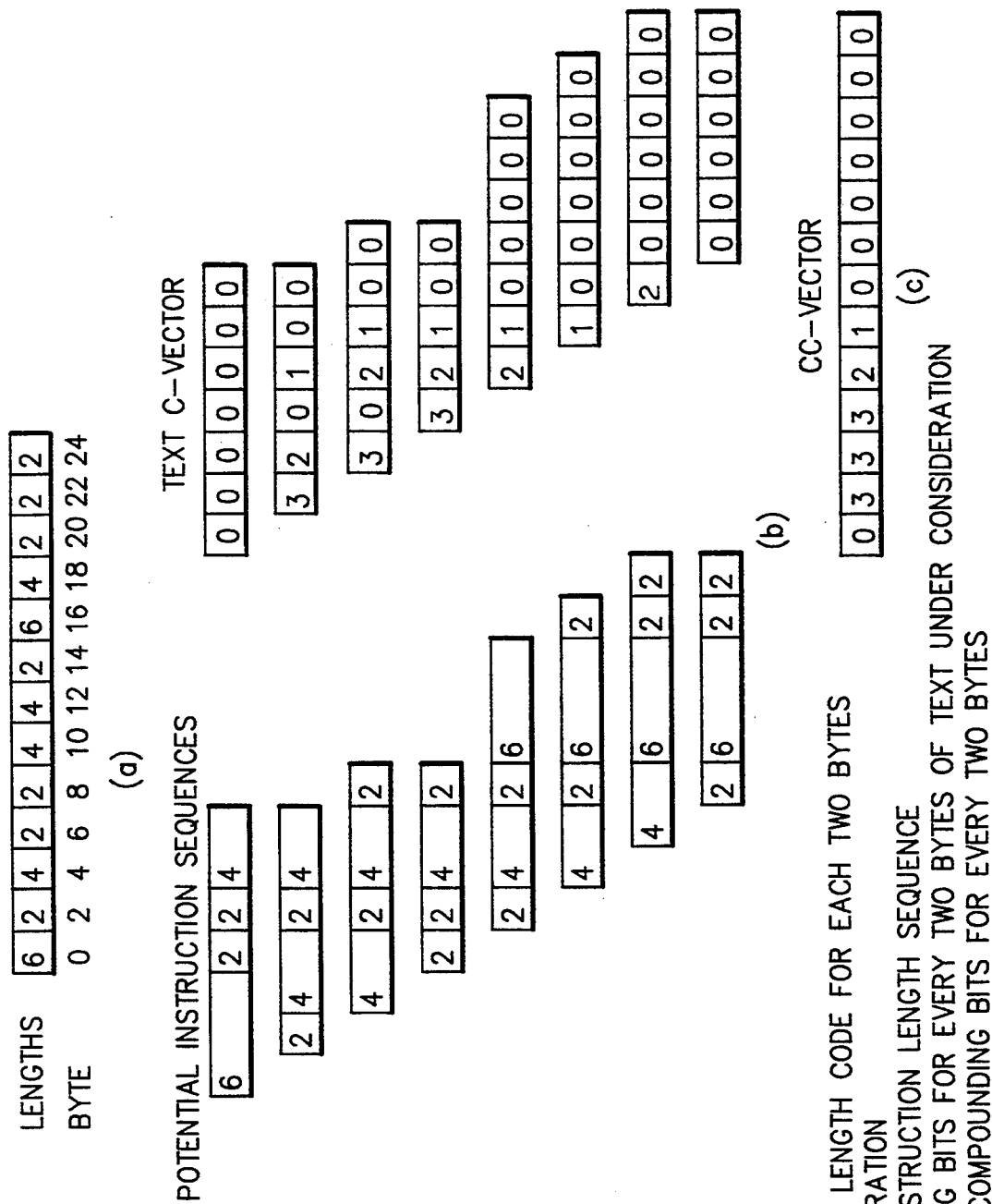

FIG. 16 illustrates a compounding example of the worst case with four instructions per group.

DETAILED DESCRIPTION OF THE PREFERRED EMBODIMENT

Referring to FIG. 1 of the drawings, there is shown a representative embodiment of a portion of a digital computer system for a digital data processing system constructed in accordance with the present invention. This computer system is capable of executing 2 or more instructions in parallel. The system includes the capability of compounding instructions for parallel or concurrent execution. In this regard, "compounding" refers to the grouping of a plurality of instructions in a sequence of scalar instructions, wherein the size of the grouping is scalable from 1 to N. For example, the sequence of scalar instructions could be drawn from an existing set of scalar instructions such as that used by the IBM System/370 products.

In order to support the concurrent execution of a group of up to N instructions, the computer system includes a plurality of instruction execution units which operate in parallel in a concurrent manner; each on its own, is capable of processing one or more types of machine-level instructions.

As is generally shown in FIG. 1, an instruction compounding unit 20 takes a stream of binary scalar instructions 21 and selectively groups some of the adjacent scalar instructions to form encoded compound instructions. A resulting compounded instruction stream 22, therefore, provides scalar instructions to be executed singly or in compound instructions formed by groups of scalar instructions to be executed in parallel. When a scalar instruction is presented to an instruction processing unit 24, it is routed to the appropriated one of a plurality of execution units for serial execution. When a compound instruction is presented to the instruction processing unit 24, its scalar components are each routed to an appropriate execution unit for simultaneous parallel execution. Typical functional units include, but are not limited to, an arithmetic logic unit (ALU) 26, 28 a floating point arithmetic unit (FP) 30 and a storage address generation unit (AU) 32.

It is understood that compounding is intended to facilitate the parallel issue and execution of instructions in all computer architectures capable of processing multiple instructions per cycle.

Referring now to FIG. 2, compounding can be implemented in a uni-processor environment where each functional unit executes a scalar instruction (S) or, alternatively, a compound instruction (CS). As shown in the drawing, an instruction stream 33 containing a sequence of scalar and compounded scalar instructions has control tags (T) associated with each compound instruction. Thus, a first scalar instruction 34 could be executed singly by functional unit A in cycle 1; a triplet compound instruction 36 identified by tag T3 could have its 3 compounded scalar instructions executed in parallel by functional units A, C, and D in cycle 2; another compound instruction 38 identified by tag T2 could have its pair of compounded scalar instructions executed in parallel by functional units A and B in cycle 3; a second scalar instruction 40 could be executed singly by functional unit C in cycle 4; a large group compound instruction 42 could have its 4 compounded scalar instructions executed in parallel by functional units A-D in cycle 5; and a third scalar instruction 44 could be executed singly by functional unit A in cycle 6.

One example of a computer architecture which can be adapted for handling compound instructions is an IBM System/370 instruction level architecture in which multiple scalar instructions can be issued for execution in each machine cycle. In this context, a machine cycle refers to a single pipeline stage required to execute a scalar instruction. When an instruction stream is compounded, adjacent scalar instructions are selectively grouped for the purpose of concurrent or parallel execution.

In general, an instruction compounding facility will look for classes of instructions that may be executed in parallel. When compatible sequences of instructions are found, a compound instruction is created.

Compounding techniques have be discussed in other applications. Reference is given to U.S. patent application Ser. No. 07/519,384 (IBM Docket EN9-90-020), filed May 4, 1990, and U.S. patent application Ser. No. 07/519,382, entitled GENERAL PURPOSE COMPOUNDING TECHNIQUE FOR INSTRUCTION-LEVEL PARALLEL PROCESSORS (IBM Docket EN9-90-019), filed May 4, 1990, for an understanding of compounding generally. An illustration of an instruction compounding unit for pairwise compounding is given in U.S. patent application Ser. No. 07/543,464 (IBM Docket EN9-90-018), filed Jun. 26, 1990.

Generally, it is useful to provide for compounding at a time prior to instruction issue so that the process can be done once for an instruction or instructions that may be executed many times. It has been proposed to locate the instruction compounding functions in the real memory of a computer system in order to implement compounding in hardware, after compile time, yet prior to instruction issue. Such compounding is considered to be a preferred alternative to other alternatives described herein and referred to as "in-memory compounding" which can be illustrated with reference to U.S. patent application Ser. No. 07/522,219 (IBM Docket EN9-90-012), filed May 10, 1990, and U.S. patent application Ser. No. 07/543,464 (IBM Docket EN9-90-018), filed Jun. 26, 1990, and FIG. 3 hereof. Memory management, as described herein by way of background, is also described in U.S. patent application Ser. No. 07/543,458 entitled MEMORY MANAGEMENT FOR SCALABLE COMPOUND INSTRUCTION SET MACHINES WITH IN-MEMORY COMPOUNDING (IBM Docket EN9-90-042), filed Jun. 26, 1990.

Generally, in-memory compounding is illustrated in FIG. 3. In FIG. 3, a hierarchical memory organization includes an I/O adaptor 40 which interfaces with auxiliary storage devices and with a computer real memory. The real memory of the organization includes a medium speed, relatively high capacity main memory 46 and a high-speed, relatively low capacity instruction cache 48. (The main memory and cache collectively are referred to herein as "real memory", "real storage", or, simply "memory".) A stream of instructions is brought in from auxiliary storage devices by way of the I/O adaptor 40, and stored in blocks called "pages" in the main memory 46. Sets of contiguous instructions called "lines" are moved from the main memory 46 to the instruction cache 48 where they are available for high-speed reference for processing by the instruction fetch and issue unit 50. Instructions which are fetched from the cache are issued, decoded at 52, and passed to the functional units 56, 58, ..., 60 for execution.

During execution, when reference is made to an instruction which is in the program, the instruction's address is provided to a cache management unit 62 which uses the address to fetch one or more instructions, including addressed instruction, from the instruction cache 48 into the queue in the unit 50. If the addressed instruction is in the cache, a cache "hit" occurs. Otherwise, a cache "miss" occurs. A cache miss will cause the cache management unit 62 to send the line address of the requested instruction to a group of storage management functions 64. These functions can include, for example, real storage management functions which use the line address provided by the cache management unit 62 to determine whether the page containing the addressed line is in the main memory 46. If the page is in main memory, the real storage management will use the line address to transfer a line containing the missing instruction from the main memory 46 to the instruction cache 48. If the line containing the requested instruction is not in the main memory, the operating system will activate another storage management function, providing it with the identification of the page containing the needed line. Such a storage management function will send to the I/O adaptor 40 an address identifying the page containing the line. The I/O adaptor 40 will bring the page from auxiliary storage and provide it to the main memory 46. To make room for the fetched page, the storage management function selects a page in the main memory 46 to be replaced by the fetched page. In SCISM architecture, it is contemplated that the replaced page is returned to auxiliary storage through the I/O adaptor without compounding tag information. In this manner, those instructions most likely to be immediately required during execution of an instruction sequence are adjacent the functional units in the instruction cache 48. The hierarchical memory organization provides the capability for fast retrieval of instructions that are required but not in the cache.

In the context of SCISM architecture, in-memory instruction compounding can be provided by an instruction compounding unit 70 which is located functionally between the I/O adaptor 40 and the main memory 46 so that compounding of the scalar instruction stream can take place at the input to, or in, the main memory 46. In this location, instructions can be compounded during an ongoing page fetch.

Alternatively, the instruction compounding unit can occupy the position 72 between the main memory 46 and the instruction cache 48 and compound instructions are formed line-by-line as they are fetched into the instruction cache 48, as may be considered a preferred embodiment.

Execution of Compound Instructions with Branching

There is a need for executing compound instructions after processing, including execution of compound instruction in the presence of branching after instructions have been analyzed statically as any other instruction. We decode instructions in advance, and append control information to the instructions in the program to be executed.

Furthermore, while achieving this goal while providing the program compounding rule means for forming a compound instruction program, architectural information is supplied comparable to that supplied to modern compilers.

During the process of analysis all members of a branch class are analyzed statically as any other instruction so as to have compound execution of instructions which is guaranteed to work .during execution in a machine. Our preferred way of handling branching is discussed with reference to FIGS. 9 and 10 hereafter. To understand that environment, a discussion of our preferred ways of compounding is appropriate.

The particular technique for compounding is a matter of design choice. However, for purposes of illustration, one technique for creating compound instructions formed from adjacent scalar instructions can be stated, as illustrated in the aforementioned In Memory Preprocessor application U.S. Ser. No. 07/543,458. By way of example, instructions may occupy 6 bytes (3 half words), 4 bytes (2 half words), or 2 bytes (1 half word) of text. For this example, the rule for compounding a set of instructions which includes variable instruction lengths provides that all instructions which are 2 bytes or 4 bytes long are compoundable with each other. That is, a 2 byte instruction is capable of parallel execution in this particular example with another 2 byte or another 4 byte instruction and a 4 byte instruction is capable of parallel execution with another 2 byte or another 4 byte instruction. The rule further provides that all instructions which are 6 bytes long are not compoundable. Thus, a 6 byte instruction is only capable of execution singly by itself. Of course, compounding is not limited to these exemplary rules, but can embrace a plurality of rules which define the criteria for parallel execution of existing instructions in a specific configuration for a given computer architecture.

The instruction set used for this example is taken from the System/370 architecture. By examining the OP code for each instruction, the length of each instruction can be determined from an instruction length code (ILC). in the op code. The instruction;s type is further defined in other op code bits. Once the type and length of the instruction is determined, a compounding tag containing tag bits is then generated for that specific instruction to denote whether it is to be compounded with one or more other instructions for parallel execution, or to be executed singly by itself.

In the example (which is not limiting), if 2 adjacent instructions can be compounded, the tag bits, which are generated in memory, are "1" for the first compounded instruction and "zero" for the second compounded instruction. However, if the first and second instructions cannot be compounded, the tag bit for the first instruction is "zero" and the second and third instructions are then considered for compounding. Once an instruction byte stream has been processed in accordance with the chosen compounding technique and the compounding bits encoded for various scalar instructions, more optimum results for achieving parallel execution may be obtained by using a bigger window for looking at larger groups of instructions and then picking the best combination of N instructions for compounding.

However, taking the above by way of example of the problem solved here, it may be considered that we have generally a need to provide the system and process illustrated generally by FIG. 4. Existing programs written in existing high level languages, as described with reference to FIG. 5, or existing assembly language programs to be processed, as described with reference to FIG. 6, need to be processed, and we have provided system which has the capability to identify sequences of instructions which can be executed as a single compound instruction in a computer designed to execute compound instructions.

Turning now to FIG. 4, is will be seen that there is illustrated pictorially the sequence in which a program is provided as an input to a compounding facility that produces a compound instruction program based on a set of rules which reflect both the system and hardware architecture. The preferred compounding facility is illustrated by U.S. Ser. No. 07/642,011 filed Jan. 15, 1991 (EN9-90-049). These rules are hereafter referred to as compounding rules. The program produced by the compounding facility can then be executed directly by a compound instruction execution engine generally illustrated by FIG. 8.

However, FIG. 5 shows a typical path taken by a program from higher level source code to actual execution, and may also be considered as one of the possible organizations suggested by FIG. 4. An alternative related to assembly level programs is discussed with respect to FIG. 6.

As will have been appreciated, referring to FIG. 5, there are many possible locations in a computer system where compounding may occur, both in software and in hardware. Each has unique advantages and disadvantages. As shown in FIG. 5, there are various stages that a program typically takes from source code to actual execution. During the compilation phase, a source program is translated into machine code and stored on a disk 46. During the execution phase the program is read from the disk 46 and loaded into a main memory 48 of a particular computer system configuration 50 where the instructions are executed by appropriate instruction processing units 52, 54, 56. Compounding could take place anywhere along this path. In general as the compounder is located closer to an instruction processing unit or CPUs, the time constraints become more stringent. As the compounder is located further from the CPU, more instructions can be examined in a large sized instruction stream window to determine the best grouping for compounding for increasing execution performance. However such early compounding tends to have more of an impact on the rest of the system design in terms of additional development and cost requirements.

The flow diagram of FIG. 6 shows the generation of a compound instruction set program from an assembly language program in accordance with a set of customized compounding rules 58 which reflect both the system and hardware architecture. The assembly language program is provided as an input to a software compounding facility 59 that produces the compound instruction program. Successive blocks of instructions having a predetermined length are analyzed by the software compounding facility 59. The length of each block 60, 62, 64 in the byte stream which contains the group of instructions considered together for compounding is dependent on the complexity of the compounding facility.

As shown in FIG. 6, this particular compounding facility is designed to consider two-way compounding for "m" number of fixed length instructions in each block. The primary first step is to consider if the first and second instructions constitute a compoundable pair, and then if the second and third constitute a compoundable pair, and then if the third and fourth constitute a compoundable pair, all the way to the end of the block. Once the various possible compoundable pairs C1–C5 have been identified, the compounding facility can select the preferred sequence of compounded instructions and use flags or identifier bits to identify the optimum sequence of compound instructions.

If there is no optimum sequence, all of the compoundable adjacent scalar instructions can be identified so that a branch to a target located amongst various compound instructions can exploit any of the compounded pairs which are encountered (See FIG. 14). Where multiple compounding units are available, multiple successive blocks in the instruction stream could be compounded at the same time.

Of course it is easier to pre-process an instruction stream for the purpose of creating compound instructions if known reference points already exist to indicate where instructions begin. As used herein, a reference point means knowledge of which byte of text is the first byte in an instruction. This knowledge could be obtained by some marking field or other indicator which provides information about the location of instruction boundaries. In many computer systems such a reference point is expressly known only by the compiler at compile time and only by the CPU when instructions are fetched. Such a reference point is unknown between compile time and instruction fetch unless a special reference tagging scheme is adopted.

The flow diagram of FIG. 7 shows the execution of a compound instruction set program which has been generated by a hardware preprocessor 66 or a software preprocessor 67. A byte stream having compound instructions flows into a compound instruction (CI) cache 68 that serves as a storage buffer providing fast access to compound instructions. CI issue logic 69 fetches compound instructions from the CI Cache and issues their individual compounded instructions to the appropriate functional units for parallel execution.

It is to be emphasized that instruction execution units (CI EU) 71 such as ALU's in a compound instruction computer system are capable of executing either scalar instructions one at a time by themselves or alternatively compounded scalar instructions in parallel with other compounded scalar instructions. Also, such parallel execution can be done in different types of execution units such as ALU's, floating point (FP) units 73, storage address-generation units (AU) 75 or in a plurality of the same type of units (FP1, FP2, etc) in accordance with the computer architecture and the specific computer system configuration.

When compounding is done after compile time, a compiler could indicate with tags which bytes contain the first byte of an instruction and which contain data. This extra information results in a more efficient compounder since exact instruction locations are known. Of course, the compiler would differentiate between instructions and data in other ways in order to provide the compounder with specific information indicating instruction boundaries.

In the exemplary two-way compounding embodiment of this application, compounding information is added to the instruction stream as one bit for every two bytes of text (instructions and data). In general, a tag containing control information can be added to each instruction in the compounded byte stream—that is, to each non-compounded scalar instruction as well as to each compounded scalar instruction included in a pair, triplet, or larger compounded group. As used herein, identifier bits refers to that part of the tag used specifically to identify and differentiate those compounded scalar instructions forming a compounded group from the remaining non-compounded scalar instructions remain in the compound instruction program and when fetched are executed singly.

In a system with all 4-byte instructions aligned on a four byte boundary, one tag is associated with each four bytes of text. Similarly, if instructions can be aligned arbitrarily, a tag is needed for every byte of text.

The case of compounding at most two instructions provides the smallest grouping of scalar instructions to form a compound instruction, and uses the following preferred encoding procedure for the identifier bits.

Since all System/370 instructions are aligned on a halfword (two-byte) boundary with lengths of either two or four or six bytes, one tag with identifier bits is needed for every halfword. In this small grouping example, an identifier bit "1" indicates that the instruction that begins in the byte under consideration is compounded with the following instruction, while a "0" indicates that the instruction that begins in the byte under consideration is not compounded. The identifier bit associated with halfwords that do not contain the first byte of an instruction is ignored. The identifier bit for the first byte of the second instruction in a compounded pair is also ignored. As a result, this encoding procedure for identifier bits means that in the simplest case only one bit of information is needed by a CPU during execution to identify a compounded instruction.

Where more than two scalar instructions can be grouped together to form a compound instruction, additional identifier bits may be required. The minimum number of identifier bits needed to indicate the specific number of scalar instructions actually compounded is the logarithm to the base 2 (rounded up to the nearest whole number) of the maximum number of scalar instructions that can be grouped to form a compound instruction. For example, if the maximum is two, then one identifier bit is needed for each compound instruction. If the maximum is three or four, then two identifier bits are needed for each compound instruction. If the maximum is five, six, seven or eight, then three identifier bits are needed for each compound instruction. This encoding scheme is shown below in Table 1:

TABLE 1

| Identifier Bits | Encoded meaning | Total # Compounded |
|---|---|---|
| 00 | This instruction is not compounded with its following instruction | none |
| 01 | This instruction is compounded with its one following instruction | two |
| 10 | This instruction is compounded with its two following instructions | three |
| 11 | This instruction is compounded with its three following instructions | four |

It will therefore be understood that each halfword needs a tag, but the CPU ignores all but the tag for the first instruction in the instruction stream being executed. In other words, a byte is examined to determine if it is a compound instruction by checking its identifier bits. If it is not the beginning of a compound instruction, its identifier bits are zero. If the byte is the beginning of a compound instruction containing two scalar instructions, the identifier bits are "1" for the first instruction and "0" for the second instruction. If the byte is the beginning of a compound instruction containing three scalar instructions, the identifier bits are "2" for the first instruction and "1" for the second instruction and "0" for the third instruction. In other words, the identifier bits for each half word identify whether or not this particular byte is the beginning of a compound instruction while at the same time indicating the number of instructions which make up the compounded group.

This method of encoding compound instructions assumes that if three instructions are compounded to form a triplet group, the second and third instructions are also compounded to form a pair group. In other words, if a branch to the second instruction in a triplet group occurs, the identifier bit "1" for the second instruction indicates that the second and third instruction will execute as a compounded pair in parallel, even though the first instruction in the triplet group was not executed.

It will be apparent to those skilled in the art that the present invention requires an instruction stream to be compounded only once for a particular computer system configuration, and thereafter any fetch of compounded instructions will also cause a fetch of the identifier bits associated therewith. This avoids the need for the inefficient last-minute determination and selection of certain scalar instructions for parallel execution that repeatedly occurs every time the same or different instructions are fetched for execution in the so-called super scalar machine.

Despite all of the advantages of compounding an instruction stream, it becomes difficult to do so under certain computer architectures unless a technique is developed for determining instruction boundaries in a byte string. Such a determination is complicated when variable length instructions are allowed, and is further complicated when data and instructions can be intermixed. Of course, at execution time instruction boundaries must be known to allow proper execution. But since compounding is preferably done a sufficient time prior to instruction execution, a technique is needed to compound instructions without knowledge of where instructions start and without knowledge of which bytes are data. This technique needs to be applicable to all of the accepted types of architectures, including the RISC (Reduced Instruction Set Computers) architectures in which instructions are usually a constant length and are not intermixed with data.

There are a number of variations of the technique of the present invention, depending on the information that is already available about the particular instruction stream being compounded. The various combinations of typical pertinent information are shown below in Table 2:

TABLE 2

| Case | Instruction Length | Data Intermixed | Reference Point |
|---|---|---|---|
| A | fixed | no | yes |
| B | variable | no | yes |
| C | fixed or variable | yes | yes |
| D | fixed | no | no |
| E | variable | no | no |
| F | fixed | yes | no |
| G | variable | yes | no |

It is to be noted that in some instances fixed and variable length instructions are identified as being different cases. This is done because the existence of variable length instructions creates more uncertainty where no reference point is known, thereby resulting in the creation of many more potential compounding bits. In other words, when generating the potential instruction sequences as provided by the technique of this invention, there are no compounding identifier tags for bytes in the middle of any fixed length instructions. Also, the total number of identifier tags required under the preferred encoding scheme is fewer (i.e., one identifier tag for every four bytes for instructions having a fixed length of four bytes). Nevertheless, the unique technique of this invention works equally well with either fixed or variable length instructions since once the start of an instruction is known (or presumed), the length can always be found in one way or another somewhere in the instructions. In the System/370 instructions, the length is encoded in the opcode, while in other systems the length maybe encoded in the operands.

In case A with fixed length instructions having no data intermixed and with a known reference point location for the opcode, the compounding can proceed in accordance with the applicable rules for that particular computer configuration. Since the length is fixed, a sequence of scalar instructions is readily determined, and each instruction in the sequence can be considered as possible candidates for parallel execution with a following instruction. A first encoded value in the control tag indicates the instruction is not compoundable with the next instruction, while a second encoded value in the control tag indicates the instruction is compoundable for parallel execution with the next instruction.

Similarly in case B with variable length instructions having no data intermixed, and with a known reference point for the instructions (and therefore also for the instruction length code) the compounding can proceed in a routine manner. The opcodes indicate an instruction sequence for example as follows: the first instruction is 6 bytes long, the second and third are each 2 bytes long, the fourth is 4 bytes long, the fifth is 2 bytes long, the sixth is 6 bytes long, and the seventh and eighth are each 2 bytes long.

For convenience of illustration, as shown in FIG. 6 for example, the illustrated examples of opcodes illustrated may be either fixed or of variable length.

For purposes of illustration, the technique for compounding herein is shown for creating compound instructions formed from adjacent pairs of scalar instructions as well as for creating compound instructions formed from larger groups of scalar instructions. The exemplary rules for the embodiments shown in the drawings are additionally defined to provide that all instructions which are 2 bytes or 4 bytes long are compoundable with each other (i.e., a 2 byte instruction is capable of parallel execution in this particular computer configuration with another 2 byte or another 4 byte instruction). The rules further provide that all instructions which are 6 bytes long in the System/370 context are not compoundable at all (i.e., a 6 byte instruction is only capable of execution singly by itself in this particular computer configuration). Of course, the invention is not limited to these exemplary compound rules, but is applicable to any set of compounding rules which define the criteria for parallel execution of existing instructions in a specific configuration for a given computer architecture.

The instruction set used in these exemplary compounding techniques of the invention is taken from the System/370 architecture. By examining the opcode for each instruction, the type and length of each instruction can be determined and the control tag containing identifier bits is then generated for that specific instruction, as described in more detail hereinafter. Of course, the present invention is not limited to any specific architecture or instruction set, and the aforementioned compounding rules are by way of example only.

The preferred encoding for compound instructions in these illustrated embodiments is now described. If two adjacent instructions can be compounded, their identifier bits which are generated for storage are "1" for the first compounded instruction and "0" and the second and third instruction are then considered for compounding. Once an instruction byte stream has been pre-processed in accordance with this technique and identifier bits encoded for the various scalar instructions, more optimum results for achieving parallel execution may be obtained by using a bigger window for looking at larger groups, and then picking the best combination of adjacent pairs for compounding.

In connection with our invention, accomplishing the tasks generally described with reference to FIG. 4-A is achieved with the assistance of a compound instruction execution engine of the kind generally described in U.S. Ser. No. 07/519,382 filed May 4, 1990 in an alternative environment.

Generally the preferred operating environment may be represented by the operational environment shown in FIG. 4-B. While the compounding facility may be a software entity, the compounding facility may be implemented by an instruction compounding unit as described in detail in U.S. Ser. No. 07/642,011 filed Jan. 16, 1991. Referring to FIG. 4-B of the drawings, there is shown a representative embodiment of a portion of a digital computer system or digital data processing system constructed in accordance with the present invention with a cache management unit 144. This computer system is capable of processing two or more instructions in parallel. It includes a first storage mechanism for storing instructions and data to be processed in the form of a series of base instructions for a scalar machine. This storage mechanism is identified as higher-level storage 136. This storage (also "main memory") is a large capacity lower speed storage mechanism and may be, for example, a large capacity system storage unit or the lower portion of a comprehensive hierarchical storage system.

The computer system of FIG. 4-B also includes an instruction compounding facility or mechanism for receiving instructions from the higher level storage 136 and associating with these instructions compound information in the form of tags which indicate which of these instructions may be processed in parallel with one another. A suitable instruction compounding unit is represented by the instruction compounding unit 137. This instruction compounding unit 137 analyzes the incoming instructions for determining which ones may be processed in parallel. Furthermore, instruction compounding unit 137 produces for these analyzed instructions tab bits which indicate which instructions may be processed in parallel with one another and which ones may not be processed in parallel with one another but must be processed singly.

The FIG. 4-B system further includes a second storage mechanism coupled to the instruction compounding mechanism 137 for receiving and storing the analyzed instructions and their associated tag fields so that these stored compounded instructions may be fetched. This second or further storage mechanism is represented by compound instruction cache 138. The cache 138 is a smaller capacity, higher speed storage mechanism of the kind commonly used for improving the performance rate of a computer system by reducing the frequency of having to access the lower speed storage mechanism 136.

The FIG. 4 system further includes a plurality of functional instruction processing units which operate in parallel with one another. These functional instruction processing units 139, 140, 141, et cetera. These functional units 139–141 operate in parallel with one another in a concurrent manner and each, on its own, is capable of processing one or more types of machine-level instructions. Examples of functional units which may be used are: a general purpose arithmetic and logic unit (ALU), an address generation type ALU, a data dependency collapsing ALU (of the preferred type shown in co-pending U.S. Ser. No. 07/504,910 filed Apr. 4, 1990), a branch instruction processing unit, a data shifter unit, a floating point processing unit, and so forth. A given computer system may include two or more or some of the possible functional units. For example, a given computer system may include two or more general purpose ALUs. Also, no given computer system need include each and every one of these different types of functional units. The particular configuration will depend on the nature of the particular computer system being considered.

The computer system of FIG. 4-B also includes an instruction fetch and issue mechanism coupled to compound instruction cache 138 for supplying adjacent instructions stored therein to different ones of the functional instruction processing units 139-141 when the instruction tag bits indicate that they may be processed in parallel. This mechanism also provides single instructions to individual functional units when their tag bits indicate parallel execution is not possible and they must be processed singly. This mechanism is represented by instruction fetch and issue unit 142. Fetch and issue unit 142 fetches instructions form the cache 138 and examines the tag bits and instruction operation code (opcode) fields, performing a decode function, and based upon such examinations sends the instruction under consideration to the appropriate ones of the functional units 138-141.

In the context of SCISM architecture, in-cache instruction compounding is provided by the instruction compounding unit 137 so that compounding of each cache line can take place at the input to the compound instruction cache 138. Thus, as each cache line is fetched from the main memory 136 into the cache 138, the line is analyzed for compounding in the unit 137 and passed, with compounding information tag bits, for storage in the compound instruction cache 138.

Prior to caching, the line is compounded in the instruction compound unit 137 which generates a set of tag bits. These tag bits may be appended directly to the instructions with which they are associated. Or they may be provided in parallel with the instructions themselves. In any case, the bits are provided for storage together with their line of instructions in the cache 138. As, needed, the compounded instruction in the cache 138 is fetched together with its tag bit information by the instruction and issue unit 142. As instructions are received by the fetch and issue unit 142, their tag bits are examined to determine by decoding examination whether they may be processed in parallel and the opcode fields are examined to determine which of the available functional units is most appropriate for their processing. If the tag bits indicate that two or more of the instructions are suitable for processing in parallel, then they are sent to the appropriate ones in in the functional units in accordance with the codings of their opcode fields. Such instructions are then processed concurrently with one another by their respective functional units.

When an instruction is encountered that is not suitable for parallel processing, it is sent to the appropriate functional unit as determined by an opcode and it is thereupon processed alone and singly by itself in the selected functional unit.

In the most perfect case, where plural instructions are always being processed in parallel, the instruction execution rate of the computer system would be N times as great as for the case where instructions are executed one at a time, with N being the number of instructions in the groups which are being processed in parallel.

FIG. 8 illustrates a compound instruction execution engine in which it is possible to execute branching in the middle of a compound instruction. Compound instructions flow from storage into the CI cache (a storage buffer providing fast access to compound instructions). The CI issue logic fetches compound instructions from the CI cache and issues them to the appropriate functional unit. The set of functional units consists of traditional functional units, such as ○ EU—execution unit, ALU
○ AU—storage address-generation unit
○ FP—floating-point arithmetic unit and others, but differ from the traditional in that each unit can execute a compound instruction, as well as a single scalar instruction. Thus, the name of each unit is prefixed with "CI", indicating that it can execute compound instructions; hence "CI EU", rather than "EU", etc. as illustrated by FIG. 8 in the drawings.

Combining several instructions into a single compound instruction allows the instruction processing unit in the computer to effectively decode and execute those instructions in parallel, thus improving performance. While the concept of parallel instruction decoding and execution is well known in the art and is discussed in the Introduction section, the normal technique employed is to dynamically decode the instruction stream at the time it enters the instruction decoding hardware to determine whether the instructions may be executed in parallel. This determination is unique to each instruction set architecture, as well as the underlying implementation of that architecture in any given instruction processor. Dynamic decoding (or dynamic scheduling, as it is described in the Introduction section) is often limited by the complexity of the architecture because it leads to complex logic to determine which combinations of instructions can be executed in parallel, and thus may increase the cycle time of the instruction processor. This invention teaches the instruction processor decoding provides compound instructions for a series of base instructions of a scalar machine generating a series of compound instructions with an instruction format text having appended control bits in the instruction format text enabling the execution of the compound instruction format text in said instruction processor which may be fetched and decodes for determining compound and single instructions which can be executed as compounded and single instructions by the arithmetic and logic units of the instruction processor and preserving intact the scalar execution of the base instructions of a scalar machine which were originally in storage. This assures that the results of executing the compound instruction are the same as would have been achieved had the instructions been executed individually, a necessary condition to the correct execution of existing programs, but capable of being generally executed in a faster manner due to the parallel nature of the compounded instruction stream.

The compounding facility may be a software entity. The design of the software will not be discussed here because the details are unique to a given instruction set architecture and underlying implementation, and because the design of such programs is somewhat similar in concept to modern compilers which perform instruction scheduling and other optimizations based on the specific machine architecture. That is, given an input program and a description of the system (instruction set) and hardware architectures (i.e., the structural aspects of the implementation), an output program is produced. In the case of the modern compiler, the output is an optimized sequence of instructions. In the case of the invention, the output is a series of compound instructions along with the necessary control bits, namely, a compound instruction program. As stated previously, the basis for forming the compound instruction program is the set of compounding rules, which supply architectural information comparable that supplied to modern compilers.

A compound instruction program is illustrated in FIG. 9. Here, the compounding facility has composed n code blocks, or compoundable units, into n compound instructions of varying lengths. Within each compound instruction is found the original instructions of varying lengths. Within each compound instruction is found the original instructions in the input program with the addition of a control field, T, appended to each instruction as illustrated by FIG. 9 in the drawings.

The bits T of FIG. 9 are defined to indicate a specific meaning. In one embodiment, the $t_0$ bit will mark the beginning of an instruction, as illustrated below. In all cases a 0 shall mean not asserted. In all cases it is preferred to have the compound instruction fetched with a certainty. Accordingly, the number of bits chosen for fetching is the maximum of number of bits which may be contained and could be executed with an instruction of the maximum instruction length of the target machine which is executing the parallel compounded instructions. Thus the fetching system provides for maximum length fetching.

While one preferred embodiment will utilize a tag which indicates the start of a compound instruction, as illustrated by "T" in FIGS. 6 and 9. However, in the preferred embodiment the T shall be understood to represent the number of instructions which follow which are to be considered part of the compounded instruction. Thus, as 0 represents a single instruction, an 1 indicates that there is one more instruction in the compound instruction, a 2 two instructions and a 3 three more instructions are compounded with the present instruction.

Accordingly, within the apparatus each compound instruction has a tag "T" for tag information related to a compound instruction appended to the instruction and a value of the information represents that the instruction is not to be part of another compound instruction or single instruction and is to be considered a single instruction, while another value to the tag information indicates that the instruction unit appended is a part of a compound instruction. The value of the tag information relates to the length of the compounded instruction and the number of instruction units within the compounded instruction to be executed.

In the preferred embodiment of the inventions the fetched compound instruction has the tag information which indicates the number of following instructions as a count value, and wherein subsequent instructions of the same compounded instructions have sub-count information provided by a sub-count tag appended to a member unit of the compounded instruction. In the following description of a preferred embodiment which relates to the use of a tag value which indicates that the instruction is part of a compound instruction, the value tag of 1 is common to both embodiments, but it should be remembered that for longer instructions than pairs, the value will relate to the number of instruction units of the compounded instruction.

As stated previously, the control field contains information relevant to the execution of compound instructions and may contain as little or as much information as is deemed efficacious for a particular implementation. For example, a control field might be defined as an 8-bit field,

| $t_0$ | $t_1$ | $t_2$ | $t_3$ | $t_4$ | $t_5$ | $t_6$ | $t_7$ | with the bits defined as follows

| Bit | Function |
|---|---|
| $t_0$ | If 1, this instruction marks the beginning of a compound instruction. |
| $t_1$ | If 1, then execute two compound instructions in parallel |
| $t_2$ | If 1, then this compound instruction has more than one execution cycle. |
| $t_3$ | If 1, then suspend pipelining. |
| $t_4$ | If instruction is a branch, then if this bit is 1, the branch is predicted to be taken. |
| $t_5$ | If 1, then this instruction has a storage interlock from a previous compound instruction. |
| $t_6$ | If 1, then enable dynamic instruction issue. |
| $t_7$ | If 1, then this instruction uses an ALU. |

The $t_0$ bit merits further discussion, in that, of all the above bits, it alone is a necessity. The purpose of the bit is to identify the beginning instruction of a compound instruction. Defining a logic 1 to mean that two instructions are to be executed in parallel and 0 to execute a single instruction execution, the hardware will easily be able to detect how many instructions comprise the compound instruction.

In general, the compounding facility will look for classes of instructions that may be executed in parallel, and ensure that no interlocks between members of a compound instruction exist that cannot be handled by the hardware. When compatible sequences of instructions are found, a compound instruction is created. For example, the System/370 architecture might be partitioned into the following classes:

1. RR-format loads, logicals, arithmetics, compares
   - LCR—Load Complement
   - LPR—Load Positive
   - LNR—Load Negative
   - LR—Load Register
   - LTR—Load and Test
   - NR—AND
   - OR—OR
   - XR—Exclusive OR
   - AR—Add
   - SR—Subtract
   - ALR—Add Logical
   - SLR—Subtract Logical
   - CLR—Compare Logical
   - CR—Compare
2. RS-format shifts (no storage access)
   - SRL—Shift Right Logical
   - SLL—Shift Left Logical

- SRA—Shift Right Arithmetic
- SLA—Shift Left Arithmetic
- SRDL—Shift Right Logical
- SLDL—Shift Left Logical
- SRDA—Shift Right Arithmetic
- SLDA—Shift Left Arithmetic 3. Branches—on count and index
   - BCT—Branch on Count (RX-format)
   - BCTR—Branch on Count (RR-format)
   - BXH—Branch on Index High (RS-format)
   - BXLE—Branch on Index Low (RS-format)
4. Branches—on condition
   - BC—Branch on Condition (RX-format)
   - BCR—Branch on Condition (RR-format)
5. Branches—and link
   - BAL—Branch and Link (RX-format)
   - BALR—Branch and Link (RR-format)
   - BAS—Branch and Save (RX-format)
   - BASR—Branch and Save (RR-format)
6. Stores
   - STCM—Store Characters Under Mask (0–4-byte store, RS-format)
   - MVI—Move Immediate (1 byte, SI-format)
   - ST—Store (4 bytes)
   - STC—Store Character (1 byte)
   - STH—Store Half (2 bytes)
7. Loads
   - LH—Load Half (2 bytes)
   - L—Load (4 bytes)
8. LA—Load Address
9. RX-format arithmetics, logicals, inserts, compares
   - A—Add
   - AH—Add Half
   - AL—Add Logical
   - N—AND
   - O—OR
   - S—Subtract
   - SH—Subtract Half
   - SL—Subtract Logical
   - X—Exclusive OR
   - IC—Insert Character
   - ICM—Insert Characters Under Mask (0- to 4-byte fetch)
   - C—Compare
   - CH—Compare Half
   - CL—Compare Logical
   - CLI—Compare Logical Immediate
   - CLM—Compare Logical Character Under Mask
10. TM—Test Under Mask The rest of the System/370 instructions are not considered to be compounded for execution in this invention. This does not preclude them from being compounded on a future compound instruction execution engine. It should be noted that the hardware structures required for compound instruction execution can be readily controlled by horizontal microcode, allowing for exploitation of parallelism in the remaining instructions, and thereby increasing performance.

One of the most common sequences in programs is to execute an instruction of the TM or RX-format compare class, the result of which is used to control the execution of a BRANCH-on-condition type instruction which immediately follows. Performance can be improved by executing the COMPARE and the BRANCH instructions in parallel, and this is sometimes done dynamically in high performance instruction processors. Some difficulty lies in quickly identifying all the various members of the COMPARE class of instructions and all the members of the BRANCH class of instructions in a typical architecture during the instruction decoding process. This difficulty is avoided by the invention, because the analysis of all the members of the classes are accomplished ahead of time and a compound instruction which is guaranteed to work is created.

Many classes of instructions may be executed in parallel, depending on how the hardware is designed. In addition to the COMPARE and BRANCH compound instruction described above, other compound instructions can be envisioned, such as LOADS and RR-format instructions, BRANCH and LOAD ADDRESS, etc. A compound instruction may even include multiple instructions from the same class, for example, RR-format arithmetic, if the processor has the necessary execution units.

In any realizable instruction processor, there will be an upper limit to the number of instructions that can comprise a compound instruction. This upper limit, m, must be specified to the compounding facility which is creating the executable instructions by generating compound instructions, so that it can generate compound instructions no longer than the maximum capability of the underlying hardware. Note that m is strictly a consequence of the hardware implementation; it does not limit the scope of instructions that may be analyzed for compounding in a given code sequence by the software. In general, the broader the scope of the analysis, the greater the parallelism achieved will be, as more advantageous compoundings are recognized by the compounding facility. To illustrate, consider the sequence:

X1 ;any compoundable instruction
X2 ;any compoundable instruction
LOAD R1,(X);load R1 from memory location X
ADD R3,R1;R3=R3+R1
SUB R1,R2;R1=R1−R2
COMP R1,R3;compare R1 with R3
X3 ;any compoundable instruction
X4 ;any compoundable instruction.

If the hardware-imposed upper limit on compounding is m=2, then there are a number of ways to compound this sequence of instructions depending on the scope of the compounding facility. If the scope were equal to four, then the compounding software would produce the pairings <−X1> <X2 LOAD> <ADD SUB> <COMP X3> <X4−>, relieving completely the hazards between the LOAD and the ADD and the SUB and the COMP. On the other hand, a superscalar machine with m=2, which pairs instructions in its instruction issue logic on strictly a first-in-first-out basis, would produce the pairings <X1 X2> <LOAD ADD> <SUB COMP> <X3 X4>, incurring the full penalty of the interlocking instructions. Unfortunately, the LOAD and ADD cannot be executed in parallel because ADD requires the result of the load. Similarly, the SUB and COMD cannot execute in parallel. Thus no performance advance is gained.

Typically there can be no guarantee that a branch into the middle of a compound instruction will not occur. This is easily handled by the hardware, as illustrated in FIG. 10. In FIG. 10, the compounding tag representation uses T=1 to mark the start of a Compounding Instruction which extends up to, but not including the next tag of value 1. If, when fetching instructions, it always fetches the maximum length compound instruction from storage, beginning at exactly the branch target address, and then executes all instructions with $t_0=0$ as a compound instruction, up to the point in the instruction text where an instruction is encountered having $t_0 = 1$, indicating the beginning of the next compound instruction. If the $t_0$ bit of the branch target is 1, then it is the beginning of a compound instruction and may be executed directly. FIG. 10 illustrates this situation.

In this figure, for simplicity of exposition, the T field associated with each compound instruction has been reduced to only the to bit. Also, the maximum length of compound instructions is three. The second instruction of $CI_1$ is a branch instruction, that, for the sake of this example, will have two possible target paths, a and b. The a path branches to the middle of $CI_j$, while the b path branches to the beginning of $CI_j$. If the branch were to follow path a, the hardware fetches the maximum length compound instruction, i.e., three instructions, then executes $I_2{}^i$ and $I_3{}^i$ as a compound instruction. The remainder of the fetch, namely $I_1{}^k$ is recognized to be the beginning of a new compound instruction, and is held in reserve while the rest of $CI_k$ is fetched for subsequent execution.

If the branch instruction took the b path to the beginning of $CI_j$, the hardware would again fetch the maximum length compound instruction, yielding, in this case, a complete compound instruction, namely $I_1{}^i$, $I_2{}^i$ and $I_3{}^i$. Execution of that compound instruction proceeds directly as illustrated by FIG. 10 in the drawings.

Improvements For Architectures With Different Attributes And For S/370 Systems With Backward Compounding The general method of compounding instructions is applicable to machines which have an instruction-level parallel processor, but these architectures can be of different types, as RISC, or preferably s/370 type base processors can be used, with their extensions in future generations with the system attributes we detail. Compounding is the process where adjacent instructions are grouped together for simultaneous execution as detailed in the foregoing description, and with variants as described in the foregoing referenced related applications. Compared to super-scalar machines of the kind described by N. P. Jouppi in "The Nonuniform Distribution of Instruction-Level and Machine Parallelism and Its Effect on Performance," IEEE Transactions on Computers, vol. 38, no. 12, Dec. 1989, pp 1645-1658, a compound instruction implementation may result in higher speed because 1. the grouping of instructions for parallel execution is optimized for hardware utilization;
2. the text is preprocessed, allowing relief of some interlocks, e.g., memory interlocks; and
3. with multiple functional units, each of which can perform multiple sequential operations in a single cycle, performance improvement is obtained due to parallel instruction execution and register dependency collapsing as was described in connection with FIGS. 1-10 and in Scalable Compound Instruction Set Machine (SCISM) Architecture application, U.S. Ser. No. 07/519,384.

The process of compounding adds the grouping information to the instruction stream for presentation to the CPU for execution. The original contents of an instruction are not destroyed but they are to be outputted as a program which will execute on a target machine, either immediately, or in stored form, as a compound instruction program. The question which needs solving is how compounding can be achieved with various possible architectures with different attributes.

In architectures with variable length instructions it is not possible, in general, to determine instruction boundaries by examining a byte string. Further complications for compounding occur when the architecture allows data and instructions to be intermixed, and allows modifications to the instruction stream. At execution time, instruction boundaries must be known to allow proper execution. Since compounding can take place before instruction execution, a system is needed to compound instructions without knowledge of where instructions start and which bytes are data. This invention describes such an apparatus. In CISC architectures, such as S/370, as detailed in the Publication of IBM No. SA22-7200-0, entitled IBM Enterprise Systems Architecture/370 Principles of Operation, for example, these problems are present. In RISC architectures which were first developed by IBM and then continued in development at Berkeley and elsewhere with various commercial implementation, e.g. RISC 6000, a product of IBM, as described for example in 1985 by D. A. Patterson, "Reduced Instruction Set Computers,", Communications of the ACM, vol. 28, no. 1, Jan. 1985, pp 8-21, instructions are usually a constant length and data are not mixed with instruction; thus, the compounding is simpler. While we have given examples which are applicable to S/370 to demonstrate the proposed apparatus, the proposed apparatus is applicable to other architectures. In addition, our examples describe solutions for differing and partial references and we will also describe a backward compounding apparatus.

There are three difficulties with S/370 instruction set architecture that make the compounding process complex. First, writes to the instruction stream may make a previous compounding invalid. A simple solution is to invalidate the instruction (or instruction buffer, or instruction cache line, etc.). The compounding process could then be repeated on the invalidated text or the text could be executed without compounding. Since writes to the instruction stream usually cause performance degradation, due to maintaining data consistency, additional degradation due to execution without compounding may be acceptable. Some optimizations of this are possible with a cache, as has been detailed in U.S. Ser. No. 07/522,219 filed May 10, 1990, entitled "Compounding Preprocessor for Cache." A second S/370 difficulty is that instructions and data can be intermixed. This invention describes the problem and proposes a solution so that the byte string can be compounded correctly without any additional information. The third difficulty in S/370 is that instructions have variable length. There are only three possible lengths (2, 4, or 6 bytes) which are indicated in the first two bits of the opcode of an instruction. Because the lengths are not fixed, the beginning of an instruction in a string of bytes cannot be identified even if it it known that the string contains only instructions. The apparatus described here provides a solution to this problem also.

Hereinafter we detail general solutions to the above problems. For simplicity, the special case of compounding a pair of instructions is described in detail. Compounding more than two instructions is an extension of the techniques and algorithms used by the system and is also discussed. There are a number of possible locations in a computer system where compounding occurs, designated the Instruction Compounding Unit (ICU). A discussion of these issues is found in U.S. Ser. No.

07/543,464 entitled "An In-Memory Preprocessor for a Scalable Compound Instruction Set Machine Processor", for example. However the system techniques and algorithms described here are also applicable to other architectures. In fact, they become simpler when the architecture has a single length for all instructions or when instructions and data cannot be mixed, e.g., RISC.

Compound Instruction Representation

In the context here, compounding information is added to the instruction stream as one bit for every two bytes of text (instructions and data). In general, a tag containing control information can be added to each instruction as was detailed with respect to FIGS. 1-10 and as was described also in U.S. Ser. No. 07/519,384 referenced above, as an example. Here, "compounding bits", refer to that part of the tag used specifically to identify groups of compound instructions. The case of compounding at most two instructions uses the following procedure to indicate where compounding occurs. Since all instructions are aligned on a halfword (2-byte) boundary, and lengths are either 2, 4, or 6 bytes, one compounding tag is needed for every halfword. A one-bit tag is sufficient to indicate compound or not compound. Specifically, a 1 indicates that the instruction that begins in the byte under consideration is compounded with the following instruction. A 0 indicates no compounding. The compounding bit associated with halfwords that do not contain the first byte of an instruction is ignored. The compounding bit for the byte of the second instruction in a compound pair is also ignored. As a consequence of this, only one bit of information is needed by the CPU during execution to appropriately execute compounded instructions. When the system allows more than two instructions to be compounded, a different method of representing the compounding information is needed. This is discussed in the section describing extensions for more than two instructions.

How To Work With Instruction Pairs

There are a number of possible variations on the basic compounding depending on what information is available. The cases are distinguished by the known content of the text and whether instruction boundaries (reference point) are known. The following cases are considered.

1. The text contains instructions only and the reference point is known.
2. The text contains instructions and data at known boundaries.
3. The text contains instructions only but reference point is unknown.
4. The text contains instructions and data with unknown reference point.
5. The text contains instructions and data with partial reference point information.

Case 1 and Case 2

In the simplest case, a byte string is to be compounded when it is known that there are no data bytes in the instruction stream, and when the location of the opcode of the first instruction is known. This may be the case in a modern architecture, as the result of a specific compiler, or as a useful assumption in a shoer section of text. The instruction to which each byte belongs can be determined precisely in all instances by using the length bits in the opcode and proceeding sequentially through the byte string. Instructions can be compounded by moving from one instruction to the next while the compound rules are being checked.

Assuming two-way instruction compounding for machines which can execute instructions in pairs and in parallel, instructions can be examined in pairs with compounding rules applied. FIG. 11 is an example of the best-case compounding where there is a specific length known. A preferred embodiment will handle this case, as well as mixed and worst cases. For this case, the Instruction Compounding Unit (ICU) can identify each instruction by examining the instruction length code (ILC) contained in each instruction opcode. Tag bits are generated with a 1 indicating the first of a compound pair. Halfwords that do not contain the beginning of an instruction are initialized to 0 and are not modified. For simplicity, it is assumed in this example that two-byte and four-byte instructions are compoundable for the target architecture and six-byte instructions are not. This depends upon the target machine and applicable compounding rules which are not here described in detail, as specific rules used to determine which instructions can be compounded depends on the instruction set architecture and the CPU design. If two instructions can be compounded, the tags 1 and 0, respectively; the following two instructions are then considered. If however, the present two instructions cannot be compounded, the tag of the first instruction is 0; the second and following instruction are then considered for compounding, and the system advances sequentially in this event during examination of the byte stream of incoming data.

A slightly more complex situation is where instructions are mixed with non-instructions, but every halfword is identified as either containing the first byte of an instruction or not (perhaps with tags). Again every byte can be identified and compounding is straightforward. This identification bit could be produced by a compiler. Issues such have been detailed in U.S. Ser. No. 07/543,464 can be examined in this context. The difference here is that compounding non-instructions is not attempted. If extra time is required to skip over non-instruction bytes, the system will be slower by an amount proportional to the amount of non-instruction bytes in the byte stream being examined. Compounding provided by the output however is not incorrect, and the instruction processor will execute the code,, albeit more slowly.

Case 3: Compounding instructions without reference point

When it is known that a byte stream contains instruction bytes only, but it is not known where the first instruction starts, compounding becomes more complex. Since the maximum length instruction is 6, but aligned on a 2-byte boundary, there are three possible starting points for the first instruction in the stream. Since it is known that only instruction are present in this stream, a simple step algorithm for the system is to start at byte 0, as if it were the beginning of an instruction and proceed with compounding. Then start at byte 2 and compound the stream; finally, start at byte 4 and compound the stream.

FIG. 12 shows an example where three different sequences of instructions are considered. For each sequence, instruction boundaries are determined and compounding bits assigned as in the best-case description. The three sequences of potential instruction boundaries (FIG. 12b) each produce a different sequence of compounding bits. Given that this system which is preferred employs an algorithm which requires three bits for every two text bytes, it is desirable to reduce the three sequences to a single sequence of bits so that the number of bits is no greater than for the best case. Since the only information required is the maximum number of instructions that for a given byte compose a compound instruction and given that for two instructions compound instructions the maximum is equal to the logical OR, the three bit sequences can be logically ORed to produce a single sequence (FIG. 12c).

The composite compounding bits of FIG. 12c are equivalent to the three sequences of FIG. 12b. Consider the "cc-vector" in FIG. 12c. If the bytes beginning at byte 0 are Considered for execution either because of sequential execution or branching, the processor fetches the instruction and the tag bits. Since the compound bit is 0, the instruction is executed as a single instruction. The next instruction, beginning at byte 6 is then considered for execution. The CPU will fetch the instruction and tag. Since the compound bit is 1, a second instruction is also fetched. (Its compound bit is ignored.) The two execute simultaneously. Note that this sequence of instruction is the first sequence shown in FIG. 12b. Because it is not known where the actual instructions boundaries are, it is possible that byte 2 starts an instruction, rather than byte 0. When byte 2 is considered for execution the instruction and tag are fetched. The compound bit is 1, so another instruction is fetched and the two are executed as a pair. This execution corresponds to the second sequence in FIG. 12b. Likewise if the first instruction starts at byte 4, the third sequence is executed. The composite bits allow any of the three possible sequences to execute with compounding. If a branch to byte 8 occurs, byte 8 must begin an instruction. Otherwise there is an error in the program. The tag associated with byte 8 is used and sequential execution can proceed. This allows the possibility of multiple valid compounding bit sequences which are selected when addressed by a branch target. It may even be useful to add this capability to the best-case, and the most complete embodiment includes this algorithm.

It is possible that the three different sequences of potential instructions will converge into one unique sequence. The rate of convergence depends on the specific bits; there are cases where no convergence will occur. At first, the convergence to the same instruction boundaries could occur with compounding out of phase. This will be corrected at the first non-compoundable instruction or earlier. In FIG. 12 note that the three sequences converge on instruction boundaries at byte 8. Also note that if additional sequences were started at 6, 8, 10, etc. they would also converge quickly. Sequences 2 and 3, while converging on instruction boundaries at byte 4, are out of phase in compounding until byte 16. That is, the two sequences consider different pairs of instructions from the same sequence of instructions. Byte 16 starts a non-compoundable instruction. (If the compounding algorithm looked at more than two instructions at a time, they might have converged sooner by choosing the same optimal pairings.) Because of this convergence, the compounding algorithm for this case can have a front end that tries three different sequences. When convergence is detected, the number of sequences collapses to two then to one. From this point, the best-case algorithm can be used. The convergence detection will be slower than the best case described for known length architectures by a factor equal to the number of active sequences, if a single compounder is used. If convergence is fast, the asymptotic compounding rates will be equivalent. Given that the convergence rate is data-dependent statistics can be gathered about probabilities of various convergence rates. However, no upper limit can be placed on the number of bytes before convergence occurs, e.g., the length sequence (4,4,4, . . . ).

Case 4: Worst-case compounding

The worst case that can occur is to have a byte stream of mixed instructions and data and to have no knowledge of where any instruction begins. This could occur when compounding a page in memory or in an instruction cache when the reference point is not known (see below). The method to handle this case begins like the instruction-only case but there is one important distinction. If convergence occurs, a new sequence must be started in place of each sequence eliminated by convergence. This is because convergence could occur in a byte containing data; consequently, all three sequences could converge to the wrong sequence of "instruction" boundaries. This could be corrected when a sequence of real instructions is encountered, in the same way that convergence occurs. (If text contains instructions only, eventually all compounding sequences converge to the same instruction boundaries, as in FIG. 12.) The resulting sequence would still execute correctly, but fewer compound pairs would be detected and CPU performance would decrease. See U.S. Ser. No. 07/519,382 filed May 4, 1990, entitled "General Purpose Compounding Technique For Instruction-Level Parallel Processors."

A solution is to start a sequence at every halfword. As in the best-case, two instructions are examined and compound bits are determined. This is repeated starting two byes later. The example in FIG. 13 assumed in the example of FIG. 12, the composite sequences in FIGS. 12 and 13 will result in identical program execution.

The worst-case is accommodated by a system which has provision for examination of more possible instruction sequences than the best-case or instruction-only cases. This implies more time and/or more compounders to produce the tags. Since no information is known about the use of the text, this is necessary to achieve maximum compounding. If less compounding is acceptable, modifications can be made to the above sequences.

Case 5: Mixed cases

In an actual implementation the ICU could be given any of the above cases, depending on where the ICU is located, the instruction set architecture, and the compiler. An interesting case is that of compounding instructions in the cache, as we prefer where compound bits could be retained in cache. Typical instruction cache hit ratios are high as recognized by others, see A. J. Smith "Cache Memories," Computing Surveys, vol. 14, no. 3, Sept. 1982, pp. 473, so it will be now appreciated that there will be much reuse of instructions that have already been compounded and will not have to be compounded again. This contrasts with compounding in an instruction buffer or stack where the compounding information is lost after the instruction is executed, even though even that may be employed in some cases. In S/370, instructions and data can be mixed, but the cache has some knowledge of which bytes are instructions, because the CPU can specify these bytes on an instruction fetch. In order to execute quickly, it has been proposed that on a cache miss or a branch to a part of a line not yet compounded, that a few (perhaps 1 or 2) instructions be sent to the CPU without attempting to compound the instructions according to U.S. Ser. No. 07/522,219 referenced above. The ICU compounds such instructions and saves the result. The ICU then begins compounding at the next instruction with knowledge of where that instruction begins. The ICU processes instructions at least as fast as CPU execution; consequently, from that point the CPU receives compound instructions (until the next cache miss or branch).

There are a few different situations that can occur under this scenario. If ICU and CPU process instructions at the same rate, ICU will remain slightly ahead of the CPU (until a branch to an uncompounded portion of a cache line or cache miss). Should ICU encounter data, it will compound the bytes as if they were instructions. Since they cannot be executed, the program will execute correctly. If the number of data bytes is small and followed by instructions, a few instructions could be compounded incorrectly until the ICU realizes that the CPU has branched around the data. However, the compounding information produced would still lead to correct execution. When the ICU determines that the CPU has branched, there are several possible actions that could be taken for those bytes which the ICU now knows were not executed. It is assumed that the ICU maintains information about which bytes have been examined for compounding and which have not.

1. The bytes not executed can be marked "not examined" in which case they will be re-examined should the code be executed later.
2. The bytes can be left in an "examined" state. The maximum compounding may not be achieved but the compound bits are correct, although they might be ignored at execution.
3. The bytes can be left in a "partially examined" state which is equivalent to one sequence of the worst-case compounding algorithm. Other sequences can be examined later.

The choice of the algorithm depends on hardware considerations and program characteristics.

Because the CPU execution rate could be slowed by data cache misses, microcoded instructions, or pipeline stalls, it is likely that the ICU could get well ahead of the CPU. The distance is dependent on characteristics of the code. If taken branches are infrequent, the distance could be large. Since the ICU is ahead of the CPU there is always a chance that the ICU will lose its reference point to instruction boundaries due to the presence of data. The further ahead it is, the greater this possibility. The situation can be handled as above, but the performance impact may be more significant as a greater number of bytes might be compounded using incorrect instruction boundaries. A solution is to slow the compounding rate. The worst-case compounding achieves this while at the same time examining all actual instructions for compounding. When ICU gets ahead of the CPU by more than a certain threshold, the ICU switches to worst-case solution program and multiple examination elements, until the CPU catches up. The value of the threshold is an implementation decision.

Should the CPU be executing from previously compounded instruction, the ICU is not needed. An implementation option is to use the ICU to compound other sections of code, in the event that they may be executed the future. The sections of code might be:

* Unexecuted parts of fetched cache lines,
* Prefetched cache lines,
* Previously executed instructions at branch targets that were sent directly to the CPU without compounding, or
* Sequential bytes following a taken branch which may have been compounded but, since they were not executed, cannot be distinguished from data.

When compounding parts of lines that have yet to be executed, the worst-case system should be used, since the ICU has no knowledge of the use of the bytes it is examining.

Possible ICU Organizations

There are many possible designs for the ICU depending on its location and the knowledge of the text contents. In this section a logical description of one possible implementation is described. FIG. 14 shows three compounders used to implement the worst-case algorithm. The number is arbitrary, and could be as large as the number of halfwords in the text buffer. The compounders begin at bytes 0, 2, and 4, respectively. Upon finishing with a possible instruction sequence, the offset by 6 bytes from the previous sequence. Each compounder keeps an internal state of tags and produces compound bits for each halfword in the text. The three sequences are ORed and the resulting composite sequence is stored with the text.

Consider, again, the cache example. An implementation might have multiple compounders as illustrated by FIG. 14, where element 160, 161, and 162 comprise separate compounders for sequences identified by the instruction facility examination. It will be noted that the output of these compounders is also coupled to logical OR element 164. One would compound using the best-case length count, staying ahead of the CPU. Another would use the worst-case system (which can be in combination with the best case) and compound other parts of the same cache line. For example, the second compounder could start at the end of the line and compound the line backwards.

Backward Compounding Apparatus

FIG. 15 illustrates backwards compounding. Beginning at the last halfword, the instruction length code of three previous halfwords are checked for consistent instruction boundaries. If the two could be sequential instruction, the compounding bits are produced according to the usual rules. The system process is provided with the sequential apparatus which repeats itself moving backward one halfword. Compounding bits are again ORed. In FIG. 15 the potential instruction at byte 24 is checked. Only byte 22 is a possible predecessor instruction. When byte 22 is checked, bytes 20, 18, and 16 are all possible predecessor instructions due to the length 2, 4, and 6, respectively. When checking byte 20 no possible instructions are found. How To Compound More Than Two Instructions The minimum amount of information needed to indicate the number of instructions compounded is the log of the maximum that can be compounded. If the maximum is two, one bit is needed for each compound instruction. If the maximum is four, two bits are needed because three, two, one, or zero instructions might be compounded with a given instruction. As described previously, each halfword needs a tag, but the CPU ignores all but the tag for the first instruction.

Consider again the worst-case algorithm, but with four-way compounding; refer to FIG. 16. A byte is examined as if it were an instruction. If it cannot be compounded, its compounding bits are 0. If it can be compounded with one other instruction, the compounding bits are 1, for the first instruction, and 0 for the second. Likewise if three are compounded, the compounding bits are 2, 1, and 0, respectively. This method assumes that if instructions A, B, and C can be compounded as a triplet, B and C can be compounded as a pair. This appears to be a valid assumption. Hence, should a branch to B occur, B and C will execute as a compound pair.

As before, the bytes beginning at each halfword must be examined for potential instruction boundaries. If more information is available, the instruction-only or best-case algorithm could be used. Each examined sequence produces a sequence of compounding bits. The composite sequence is formed by taking the maximum value of the individual compounding bits produced by the sequences. When a compound group is executed, the CPU ignores all compound bits associated with bytes other than the first byte of the group. The compound bits indicate the number of instructions which make up the compound group.

Depending on the actual compounding rules used there may be some optimizations for this algorithm. For example, in FIG. 16*b*, the fifth sequence (starting at byte 8) assumes instructions of lengths 2, 4, 2, and 6. Since six-byte instructions are never compoundable in this example, there is no benefit in attempting to compound starting at the other three instructions (bytes 10, 12, 14), since they have already been compounded as much as possible. Due to the brevity of this example, no potential sequences starting after byte 14 are examined.

To reduce the number of bits to transfer, there may be alternative representations of the compound information. When a compound instruction is requested from the cache, the compound bits could be translated into a different format. For example, One bit per instruction with the encoding: "1" means compound with next instruction and 0 means do not compound with next instruction. A group of four compounded instructions would have the compounding bits (1,1,1,0). In the preferred embodiment, the group of four compounded instructions would have compounding tags for instruction member units represented as having a value of 3,2,1,0. Compounding bits associated with halfwords not containing opcodes are ignored.

While a general purpose apparatus for compounding groups of instructions has been presented, we prefer to provide the system with an apparatus that operates in the worst-case situation of no knowledge of the use of the bytes under examination. When some knowledge of the text content is available, the apparatus can be simplified, as in the more simplified architectures we discussed. An extension to the basic length count can be used when the maximum number of instructions in a compound group is greater than two.

Clearly, the inventions we have described by way of example and in illustration of the best mode for practicing the inventions provide a basis for much potential growth in processor performance. Accordingly, it will be understood that those skilled in the art after reviewing our presently and alternative embodiments, that various modifications and improvements may be made, now and in the future, as those skilled in the art will appreciate upon the understanding of our disclosed inventions. Such modifications and future improvements are to be understood to be intended to be within the scope of the appended claims which are to be construed to protect the rights of the inventors who first conceived of these inventions.

What we claim is:

1. A system for compounding instructions in a byte stream including instructions which cannot be compounded prior to fetching and identifying said instructions for execution, said instructions being compounded in accordance with compounding rules for classes of instructions that can be compounded for a particular processor architecture, said system comprising:

means for examining the byte stream in sets of a fixed length of bits assigned for an opcode as an instruction length code and proceeding sequentially through said byte stream from one instruction to the next, means to identify a boundary of each instruction in said byte stream in response to said means for examining, means for applying said compounding rules to instructions whose boundaries have been identified by said identification means; and means responsive to said means for applying said compounding rules, for generating tag bit information for an instruction which can be compounded to indicate an initial instruction of a set of compoundable instructions;

said means for applying said compounding rules marking an instruction which cannot be compounded to indicate it is not an initial instruction of a set of compoundable instructions and examining a subsequent group of instructions which includes the next sequential instruction to an introduction marked as an instruction which cannot be compounded.

2. A system according to the preceding claim 1 in which a halfword in an instruction is marked to indicate that the halfword is not an initial compound instruction.

3. A system according to the preceding claim 1 in which instructions are examined for pairs.

4. A system according to the preceding claim 1 in which the examination for pairs looks at larger groups than adjacent instruction opcodes, and a best pair is picked for compounding according to said compounding rules.

5. A system according to the preceding claim 1 in which instructions to be examined are mixed with non-instructions or data and wherein said generating means marks every halfword either as containing the first byte of an instruction or as an instruction not containing the first byte of a compound instruction, and output means for continuing the process of compounding which skips over in the compounding process the instruction marked as not containing the first byte of a compound instruction.

6. A system according to claim 1 wherein in the event it is not known where in the instruction set stream being examined are bounded with a plurality of possible sequences of instructions, determination means are provided for each sequence possible boundaries to be determined, and logical means are provided for reducing plural sequences to a single sequence by computing the maximum of said plurality of possible sequences.

7. A system according to the preceding claim 6 wherein there are three possible sequences of instructions with potential boundaries, each of which would produce a different sequence of compounding bits, and wherein the three bit sequences are logically ORed by said logical OR means to produce a single sequence to determine whether the current instruction is compounded by the instruction processor.

8. A system according to the preceding claim 6 wherein said examination means examines a set of instructions and compounding bits are determined for a sequence by said determination means, and this examination and determination technique is repeated starting a number of bytes in sequence later, and said logical OR means is coupled for compounding bits from each sequence to be ORed to form a composite compound bit instruction.

9. A system according to claim 6 wherein in the event it is not known where in the base instruction set stream being examined are bounded with a plurality of possible sequences of instructions, determination means are provided for each sequence possible boundaries to be determined, and logical OR means are provided for reducing plural sequence to a single sequence by logically ORing said plurality of possible sequences.

10. A system according to the preceding claim 1 wherein there are several possible sequences of instructions with potential boundaries, each of which would produce a different sequence of compounding bits, and wherein there is provided a convergence means for compounding which experimentally tries the several possible sequences for convergence on a byte boundary, and when a convergence is detected, one of the converging sequences is eliminated.

11. A system according to the preceding claim 10 wherein there is provided collapsing means for collapsing the number of sequences until a single sequence remains.

12. A system according to the preceding claim 10 wherein in the case when the byte stream of incoming information of the instruction sequence may have mixed instructions and data and wherein there is no knowledge of where any instructions begin, if a convergence occurs and a sequence is eliminated by convergence, said convergence means includes means for starting a new sequence in place of a sequence eliminated by convergence.

13. A system according to the preceding claim 12 wherein each sequence is started at every halfword.

14. A system according to the preceding claim 10 wherein in the case when the byte stream of incoming information of the instruction sequence being processed by the compounding facility may have mixed instructions and data and wherein there is no knowledge of where any instructions begin, if a convergence occurs and a sequence is eliminated by convergence, a new sequence is started in place of a sequence eliminated by convergence.

15. A system according to the preceding claim 14 wherein each sequence is started at every halfword.

16. A system according to the preceding claim 14 wherein after one group of a set of instructions are examined and compounding bits are determined, the examination means processes for examination again with a group repeated starting a number of bytes in sequence later, and compounding bits from each sequence are ORed to form a composite compound bit instruction.

17. A system according to the preceding claim 1 wherein the compound bits of an instruction indicate the number of instructions which make up a compound group instruction.

18. A system according to the preceding claim 1 in which there are a plurality of member units for a compound instruction and information is provided for the compound instruction applicable to a member instruction unit of the compound instruction indicating whether or not it is to be compounded with a subsequent instruction.

19. A system according to the preceding claim 1 wherein the system instruction processor central processor during execution ignores all but tag information of a first instruction member of a compound instruction.

20. A system according to the preceding claim 1 wherein during examination bytes not executed are marked as not examined in which case they will be reexamined could the code be later executed by the instruction processor.

21. A system according to the preceding claim 1 wherein during examinations bytes not executed are left in an examined state, indicating the correctness of location even though they may be ignored or not executed during execution.

22. A system according to the preceding claim 1 wherein during examination bytes are left in a partially examined sequence state for examination of other sequences later.

23. A system according to claim 1 wherein to reduce the number of bits to transfer, there can be alternative representations of the compound information, and wherein when a compound instruction is requested the compound bits can be be translated into a different format.

24. A system according to claim 23 wherein one bit per instruction with the encoding of a value which means compound with next instruction and no value 0 which means do not compound with next instruction.

25. A system for processing instructions by a target instruction processor in which certain component instructions of a base instruction sequence can be executed in parallel and certain component instructions in said base instruction sequence cannot be executed in parallel and for compounding the base instruction sequence for execution in parallel of at least some of the base instructions, comprising, an instruction processor having a central processing unit, a cache, a memory, a compounding facility for said instruction processor disposed between said memory and said cache for compounding instructions prior to fetching and identifying said instructions for execution, said compounding facility including a plurality of compounding units which enable the system to process an incoming sequence of scalar instructions and to transform them into a compound instruction program in which at least some compound member units of a compound instruction are executable in parallel by said target instruction processor, each of said compounding units including:

means for determining applicable architectural compounding rules in which classes of instructions which may be compounded for a particular architecture, means for examining a base instruction sequence byte stream in sets of bits for an opcode and for proceeding sequentially through the base instruction byte stream from one instruction to the next, means to identify a boundary of an instruction unit member of said compound instruction in said base instruction byte stream in response to said means for examining, means for applying said compounding rules to instructions whose boundaries have been identified by said identification means; and generating means responsive to said means for applying said compounding rules, for generating tag bit information for an instruction which tag bit information indicates an initial compound instruction of a set of compoundable instructions, and if an initial instruction of a set is not an initial compoundable instruction, marking that instruction so that an output means will not indicate to an executing instruction processor that it is an initial instruction, and as such instructions are marked as not initial instructions, said means for examining examines a subsequent group of instructions which includes a next sequential instruction in the group which had just been examined.

26. A system according to the preceding claim 25 wherein in said compounding facility there are means for a cache miss or a branch to the part of a line not yet compounded such that output means for providing a compound sequence of compound instructions provides a plurality of instructions to the central processing unit via said instruction program without compounding of the instructions.

27. A system according to the preceding claim 25 wherein should the compounding facility examine a byte stream and encounter data, the compounding facility output means will compound data as if the data consisted of instructions, and wherein an instruction processor which cannot execute data will accordingly execute a compound instruction program correctly.

28. A system according to the preceding claim 25 in which halfwords which exist in an instruction are initialized by said generating means to indicate that the halfword is not an initial compound instruction.

29. A system according to the preceding claim 25 in which instructions are examined for pairs.

30. A system according to the preceding claim 29 in which examination for pairs by said examination means looks at larger groups than adjacent instruction opcodes of a base instruction byte stream, and optimization means are provided such that a best pair is picked for compounding according to said compounding rules.

31. A system according to the preceding claim 25 in which instructions are mixed with non-instructions or data and instruction members of a compound instruction are marked every halfword either as containing the first byte of an instruction or as an instruction not containing the first byte of a compound instruction, and said output means causes skipping over in the compounding process the instruction marked as not containing the first bite of a compound instruction.

32. A system according to claim 25 wherein in the event it is not known where in the base instruction set stream being examined are bounded with a plurality of possible sequences of instructions, determination means are provided for each sequence possible boundaries to be determined, and logical OR means are provided for reducing plural sequence to a single sequence by logically ORing said plurality of possible sequences.

33. A system according to the preceding claim 32 wherein there are three possible sequences of instructions with potential boundaries, each of which would produce a different sequence of compounding bits, and wherein the three bit sequences are logically ORed by said logical OR means to produce a single sequence to determine whether the current instruction is compounded by the instruction processor.

34. A system according to the preceding claim 32 wherein said examination means examines a set of instructions and compounding bits are determined for a sequence by said determination means, and this examination and determination technique is repeated starting a number of bytes in sequence later, and said logical OR means is coupled for compounding bits from each sequence to be ORed to form a composite compound bit instruction.

35. A system according to the preceding claim 25 wherein there are several possible sequences of instructions with potential boundaries, each of which would produce a different sequence of compounding bits, and wherein there is provided a convergence means for compounding which experimentally tries the several possible sequences for convergence on a byte boundary, and when a convergence is detected, one of the converging sequences is eliminated.

36. A system according to the preceding claim 35 wherein there is provided collapsing means for collapsing the number of sequences until a single sequence remains.

37. A system according to the preceding claim 35 wherein in the case when the byte stream of incoming information of the base instruction sequence may have mixed instructions and data and wherein there is no knowledge of where any instructions begin, if a convergence occurs and a sequence is eliminated by convergence, said convergence means includes means for starting a new sequence in place of a sequence eliminated by convergence.

38. A system according to the preceding claim 37 wherein each sequence is started at every halfword.

39. A system according to the preceding claim 25 wherein a plurality of compounding units are provided and a set of instructions is examined and compounding bits are determined and a sequence is examined by said plurality of separate compounding units each of which has an output which is combined as a composite compound vector.

40. A system according to the preceding claim 39 wherein a logical OR unit is provided coupled to said plurality of compounding units and a set of instructions is examined and a composite compound vector created based upon the output of said logical OR unit and said compounding units by said output means.

41. A system according to the preceding claim 25 wherein two instruction member units of a compound instruction form a pair of instructions which can be executed in parallel by the instruction processor.

42. A system according to the preceding claim 25 in which instructions are identified during a process of fetching instructions from memory, wherein upon retrieval and before examination they are marked as instructions and not data.

43. A system according to the preceding claim 25 wherein the compound bits of an instruction indicate the number of instructions which make up a compound group instruction.

44. A system according to the preceding claim 25 in which there are a plurality of member units for a compound instruction and information is provided for the compound instruction applicable to a member instruction unit of the compound instruction indicating whether or not it is to be compounded with a subsequent instruction.

45. A system according to the preceding claim 25 wherein the system instruction processor central processor during execution ignores all but tag information of a first instruction member of a compound instruction.

46. A system according to the preceding claim 25 wherein during examination bytes not executed are marked as not examined in which case they will be reexamined could the code be later executed by the instruction processor.

47. A system according to the preceding claim 25 wherein during examinations bytes not executed are left in an examined state, indicating the correctness of location even though they may be ignored or not executed during execution.

48. A system according to the preceding claim 25 wherein during examination bytes are left in a partially examined sequence state for examination of other sequences later.

49. A system according to the preceding claim 25 where there is both forward compounding and backwards compounding.

50. A system according to the preceding claim 25 where there is provided with said compounding facility the control means to provide multiple modes of operation depending on the reference point information available.

* * * * *

UNITED STATES PATENT AND TRADEMARK OFFICE
CERTIFICATE OF CORRECTION

PATENT NO. : 5,448,746
DATED : September 5, 1995
INVENTOR(S) : Richard J. Eickemeyer et al.

It is certified that error appears in the above-identified patent and that said Letters Patent is hereby corrected as shown below:

On the title page, item [54], col.1, line 1.

Delete "COMOUNDING" and insert --COMPOUNDING--

Col. 35    Line 63    Delete "starling" and insert --starting--
claim 16

Signed and Sealed this

Eighteenth Day of May, 1999

Attest:

Q. TODD DICKINSON

*Attesting Officer*      *Acting Commissioner of Patents and Trademarks*